(12) United States Patent
Nagae

(10) Patent No.: US 6,230,169 B1
(45) Date of Patent: May 8, 2001

(54) APPARATUS WITH A DISPLAY MAGNIFICATION CHANGING FUNCTION OF ANNOTATION

(75) Inventor: Hisayoshi Nagae, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/961,101

(22) Filed: Oct. 30, 1997

(30) Foreign Application Priority Data

Mar. 3, 1997 (JP) ................................................ 9-048126

(51) Int. Cl.⁷ ............................. G06F 15/00; G06F 17/00
(52) U.S. Cl. ............................................ 707/512; 707/526
(58) Field of Search .................................. 707/517, 500, 707/526, 515, 537, 530; 345/118, 121, 116, 113, 336, 339, 342, 347

(56) References Cited

U.S. PATENT DOCUMENTS

| | | | |
|---|---|---|---|
| 5,559,942 | * 9/1996 | Gough et al. | 395/155 |
| 5,577,188 | * 11/1996 | Zhu | 395/326 |
| 5,581,682 | * 12/1996 | Anderson et al. | 707/530 |
| 5,621,871 | * 4/1997 | Jaremko et al. | 345/441 |
| 5,689,717 | * 11/1997 | Pritt | 707/512 |
| 5,734,915 | * 3/1998 | Roewer | 707/512 |
| 5,950,214 | * 9/1999 | Rivette et al. | 707/512 |

FOREIGN PATENT DOCUMENTS 6-68085   3/1994  (JP) .

* cited by examiner

Primary Examiner—JosephH. H. Feild
Assistant Examiner—Alford W. Kindred
(74) Attorney, Agent, or Firm—Pillsbury Madison & Sutro Intellectual Property

(57) ABSTRACT

An annotation input section reads from a text file the individual data items constituting an annotation pasted in a specified annotation position on a text as a result of the annotation being inputted from an annotation input window and acquires the input positions of the annotation data items and information on their size. A annotation image magnification change section produces a reduced or enlarged image of the display image of the annotation on the basis of the input positions of the individual annotation data items in the annotation and information on their size acquired by the annotation input section and a specified magnification indicated by a magnification storage section. A text and annotation image display section produces a display image by putting the reduced or enlarged display image of the annotation in the user-specified annotation position on a text display image and displays the display image on the text display screen of a display unit.

16 Claims, 21 Drawing Sheets

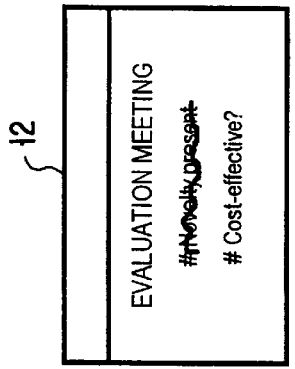

PATENT PROPOSAL

1. [TITLE OF THE INVENTION]
ANNOTATION DISPLAY APPARATUS

2. [CLAIMS]

2.1 [CLAIM 1]
AN ANNOTATION DISPLAY DEVICE CHARACTERIZED BY COMPRISING:
   ANNOTATION INPUT MEANS FOR INPUTTING ANNOTATIONS;
   IMAGE MAGNIFICATION CHANGE MEANS FOR ACQUIRING THE INPUT POSITIO
ITEMS AND INFORMATION ON THEIR SIZE FROM THE ANNOTATION INPUT MEANS AN
MAGNIFICATION OF THE DISPLAY IMAGE OF THE ANNOTATION ACCORDING TO A PR
MAGNIFICATION; AND
   TEXT AND ANNOTATION IMAGE DISPLAY MEANS FOR SUPERPOSING THE DISPLAY IMAGE OF THE
ANNOTATION CREATED BY THE ANNOTATION IMAGE MAGNIFICATION CHANGE MEANS IN THE ANNOTATION
DISPLAY POSITION ON THE TEXT ON THE TEXT OUTPUT SCREEN.

FIG. 12

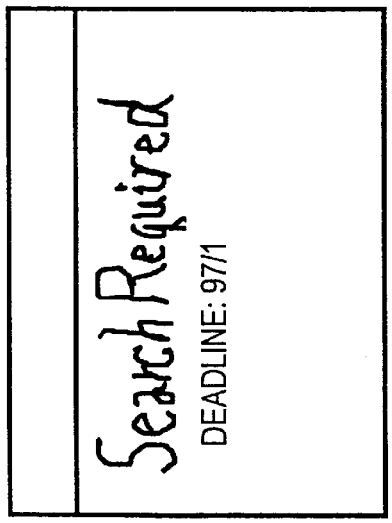

FIG. 16A 2.2 EFFECT OF CLAIM 1

THE IMAGE DATA ITEM INPUTTED FROM THE ANNOTATION INPUT MEANS IS REDUCED OR ENLARGED BY THE ANNOTATION IMAGE MAGNIFICATION CHANGE MEANS TO AN IMAGE WITH MAGNIFICATION. THE DISPLAY IMAGE OF THE ANNOTATION IS SUPERPOSED ANNOTATION IMAGE DISPLAY MEANS ON THE TEXT.
  USE OF THE ABOVE MEANS ENABLES THE ENLARGED ANNOTATION TO E ON THE TEXT DISPLAY SCREEN. THIS ENABLES THE USER TO CHECK THE CC WHILE READING THE TEXT. AS A RESULT, THE USER NEED NOT TAKE THE TR WINDOW ONLY FOR THE PURPOSE OF CHECKING THE CONTENTS OF THE ANN A CONVENTIONAL EQUIVALENT.

FIG. 16B

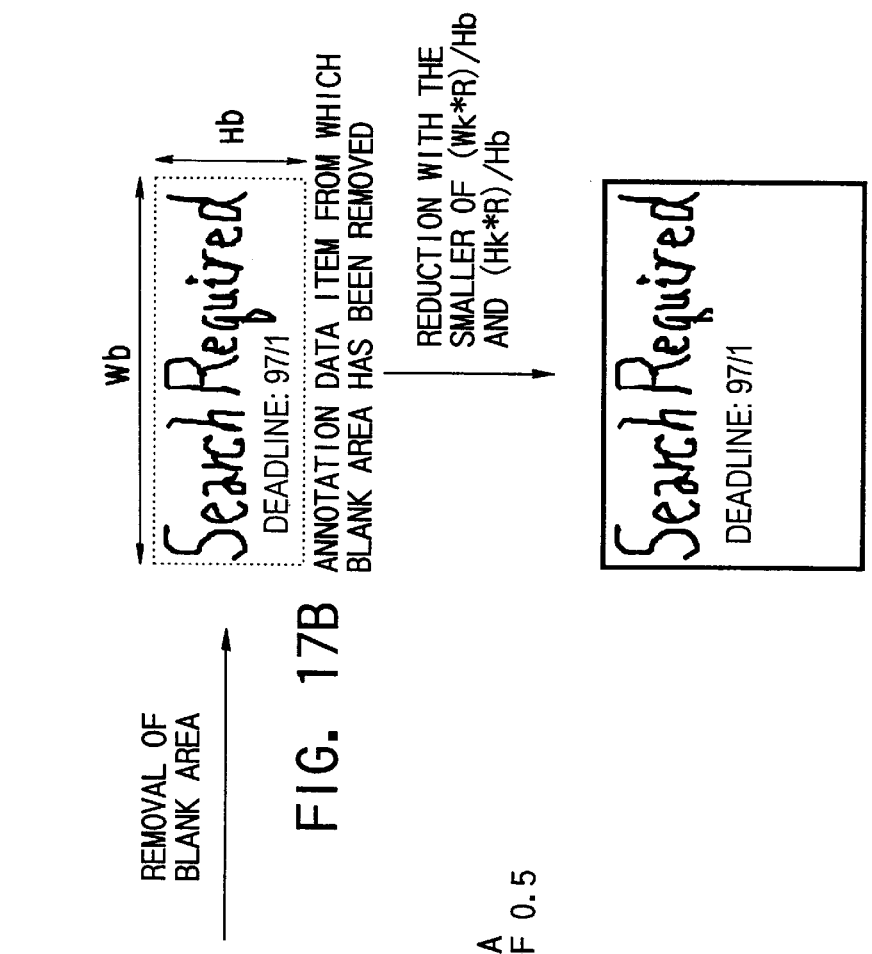
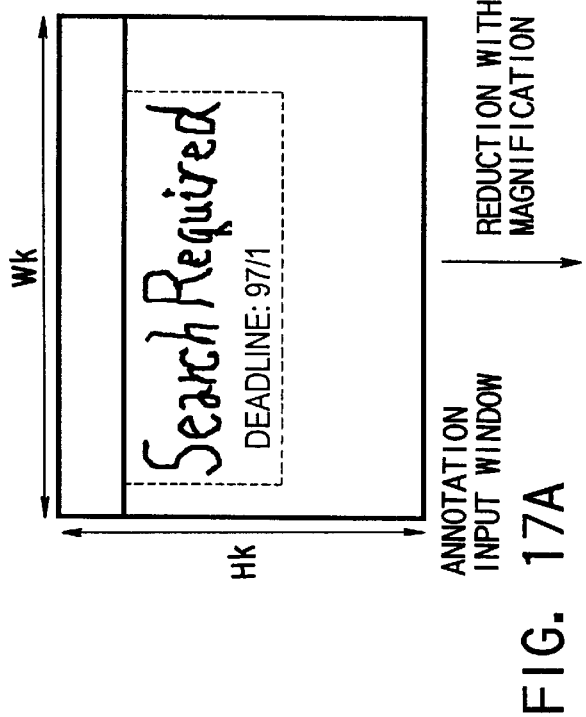
FIG. 17A  FIG. 17B  FIG. 17C  FIG. 17D 2.2 EFFECT OF CLAIM 1

THE IMAGE DATA ITEM INPUTTED FROM THE ANNOTATION INPUT MEANS IS REDUCED OR ENLARGED BY THE ANNOTATION IMAGE MAGNIFICATION CHANGE MEANS TO AN IMAGE WITH A MAGNIFICATION. THE DISPLAY IMAGE OF THE ANNOTATION IS SUPERPOSED B ANNOTATION IMAGE DISPLAY MEANS ON THE TEXT.

USE OF THE ABOVE MEANS ENABLES THE ENLARGED ANNOTATION TO BE ON THE TEXT DISPLAY SCREEN. THIS ENABLES THE USER TO CHECK THE CON WHILE READING THE TEXT. AS A RESULT, THE USER NEED NOT TAKE THE TRO WINDOW ONLY FOR THE PURPOSE OF CHECKING THE CONTENTS OF THE ANNO A CONVENTIONAL EQUIVALENT.

*Search Required*
DEADLINE: 97/1

FIG. 18

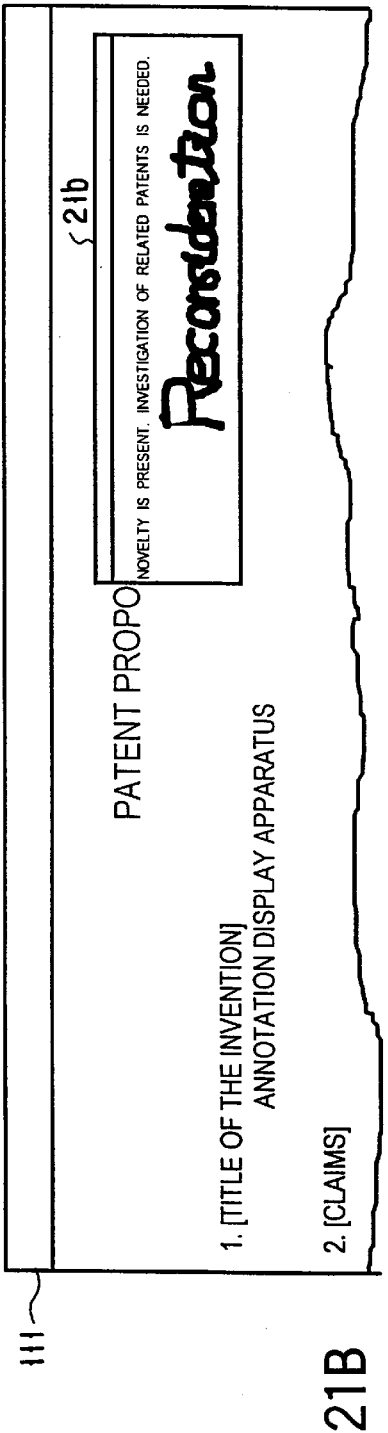
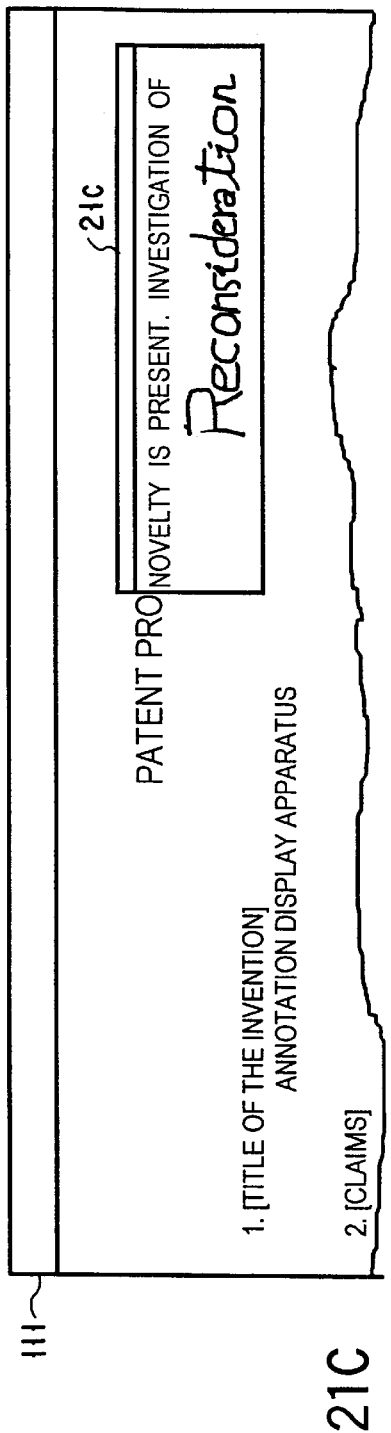
FIG. 21A
FIG. 21B
FIG. 21C

APPARATUS WITH A DISPLAY MAGNIFICATION CHANGING FUNCTION OF ANNOTATION

BACKGROUND OF THE INVENTION

This invention relates to a data processing apparatus having an annotation display function that reduces or enlarges the display image of the annotation pasted on a text as a result of being inputted through the annotation input window and that superposes the display image with the changed magnification in a specified position on the display image on the text display screen.

With a conventional data processing apparatus with an annotation display function that displays the annotations pasted on text, in a case where the user carries out the operation of pasting an annotation in a specific position on text, the annotation being entered on a window screen (an annotation input window), when the user displays the text again, a mark (an annotation mark) 22 indicating the fact that the annotation has been pasted is displayed as shown in FIG. 22.

When the user wants to check the contents of the annotation pasted in the position in which the annotation mark 22 appears, the user has to click the mark 22 to display the window screen again and check the contents of the annotation.

As described above, with the conventional data processing apparatus with an annotation display function, when an annotation is pasted on text, only a mark indicating that the annotation has been pasted is displayed on the text display screen as shown in FIG. 22. The mark alone prevents the user from checking the contents of the annotation written in the text at a single glance. Thus, the user has to repeat troublesome operations: that is, the user has to take the trouble to click the mark to display the contents of the annotation again on the window screen, check the contents, and then erase the window screen again to read the text.

BRIEF SUMMARY OF THE INVENTION

It is, accordingly, an object of the present invention to provide a data processing apparatus with an annotation display function that enables the user to check the contents of annotations while reading the text, by reducing or enlarging the display image of an annotation input window with a specified magnification in displaying annotations and by superposing the display image in a specified position on a text display image on a text display screen.

Another object of the present invention is to provide a data processing apparatus with an annotation display function that enables the user to check the contents of annotations easily even when a simple reduction of annotations makes the annotations illegible because annotation data items in the annotations overlap with each other, by displaying a reduced display image of the annotations from which the overlap of annotation data items has been removed.

Still another object of the present invention is to provide a data processing apparatus with an annotation display function that enables the user to check the contents of annotations easily even when a simple reduction of annotations makes the annotations illegible because the size of annotation data items in the annotations is small, by reducing or enlarging only the area from which blanks have been removed and thereby making the contents of the annotations larger with the entire display size remaining unchanged.

Still another object of the present invention is to provide a data processing apparatus with an annotation display function that enables the user to check the contents of annotations easily by sensing annotation data items whose contents would be difficult to check if the annotations were simply reduced and displayed with a specified magnification because the display size is small and by using the smallest magnification that prevents the display size after the magnification change from being smaller than a display limit value for the annotation data items, thereby displaying the contents of the annotations larger with the entire display size remaining unchanged.

A data processing apparatus with an annotation display function according to the first aspect of the present invention is characterized by comprising: annotation input means for taking in the individual data items constituting an annotation pasted in a specified annotation position (annotation writing position) on a text as a result of the annotation being inputted from an annotation input window and acquiring the input positions of the annotation data items and information on their size; annotation image magnification change means for changing the display magnification of a display image of the annotation on the basis of the input positions of the individual annotation data items in the annotation and information on their size acquired by the annotation input means and a specified magnification; and text and annotation image display means for putting and displaying the display image of the annotation whose magnification has been changed by the annotation image magnification change means in the specified annotation position on a text display image. The specified magnification may be prepared beforehand in the system (a system-specified magnification) or a user-specified magnification. When the user does not specify any magnification in particular, a default magnification may be used. When the user has specified a magnification, the magnification may be used in place of the default magnification.

With such a configuration, the annotation image magnification change means creates a reduced or enlarged image of the display image of the annotation on the basis of the input positions of the individual annotation data items in the annotation and information on their size acquired by the annotation input means. The reduced or enlarged display image of the annotation is put and displayed in the specified annotation writing position on a text display image by the text and annotation image display means. The size of the reduced or enlarged display image of the annotation is the size of the annotation input window at annotation setting reduced or enlarged with the specified magnification.

Because the reduced or enlarged display image of the annotation can be superposed on the display image of the text on the text display screen, the user can check the contents of the written annotation while reading the text and need not take the trouble to use another window only for the purpose of checking the contents of the annotation, differently from a conventional equivalent.

In a case where the size of the annotation display image on the text display screen is made changeable, for example, when the contents have been checked, the user can reduce the size of the annotation display image substantially to make a display as if the conventional annotation mark were displayed. By the user's operation, all of the annotation display image or only the user-specified annotation display image on the text display screen may be erased.

A data processing apparatus with an annotation display function according to the second aspect of the present invention is such that annotation data display overlap removing means for sensing an area where at least two annotation data items overlap with each other, determining only one data item to be displayed in the overlapping area, and acquiring specific information indicating the overlapping area and an annotation data item to be displayed in the area is added to the data processing apparatus with an annotation display function according to the first aspect. The data processing apparatus of the second aspect is characterized in that the annotation image magnification change means changes the display magnification of a display image of the annotation where the display image portion of the annotation data items except for the annotation data item to be displayed in the overlapping area has been subtracted from the overlapping area indicated by the specific information acquired by the annotation data display overlap removing means and the display image of the annotation whose magnification has been changed is put and displayed in the specified annotation position on a text display image.

The approach of sensing an area where at least two annotation data items overlap with each other and determining only one annotation data item to be displayed in the overlapping area may be the approach of displaying the earliest or latest of the relevant annotation data items or the approach of prioritizing the individual types of annotation data items and displaying the one with the highest level of priority. In this case, the annotation data items may be rearranged in the order in which they have been entered, or in the opposite order, or in ascending order or priority level, taking out the annotation data items (called the first annotation data items) from the beginning one, sensing an area where the annotation data items (called the second data items) after the first data items overlap with each other, and registering information on the area so as to correspond to the first annotation data items as information on an area not to be displayed in the first annotation data items in displaying the display image of the first annotation data items.

With such a configuration, a reduced or enlarged image from which the overlap of annotation data items has been removed is created and put in the annotation position on the text display image.

Therefore, even when a simple reduction of an annotation makes the contents of the annotation illegible because annotation data items in the annotation overlap with each other, the contents of the annotation can be checked easily because a reduced display image of the annotation from which the overlap of annotation data items has been removed.

A data processing apparatus with an annotation display function according to the third aspect of the present invention is such that annotation blank area separating means for sensing the smallest rectangular area including the area in which individual annotation data items have been inputted from an annotation input window is added to the data processing apparatus with an annotation display function of the first aspect. The data processing apparatus of the third aspect is characterized in that annotation image magnification change means changes the display magnification of a display image in the rectangular area to change the magnification of only the display image of the annotation data items to be displayed in the rectangular area acquired by the annotation blank area separating means, and the display image of the annotation whose magnification has been changed is put and displayed in the specified annotation position on a text display image.

With such a configuration, only the smallest rectangular area including the area in which the annotation data items have been inputted from the annotation data input window, or only the area from which the blank has been removed, is subjected to magnification change display. For example, only the smallest rectangular area is subjected to reduced display and the reduced image is superposed in the specified annotation position on the text display image. Therefore, even when a simple reduction of an annotation makes the contents of the annotation illegible because the size of annotation data items in the annotation is small, the contents of the annotation can be displayed larger, making the contents legible.

A data processing apparatus with an annotation display function according to the fourth aspect of the present invention is such that annotation data magnification adjusting means which checks to see if the display size with a specified magnification is smaller than the display limit value indicating the limit value of a display size the user can identify and which, if the display size is smaller than the display limit value, determines the smallest magnification necessary for making the display size of the display image of the annotation data item larger than the display limit value to be the magnification for the annotation data item and, if the display size is not smaller than the display limit value, determines the specified magnification to be the magnification for the annotation data item is added to the data processing apparatus with an annotation display function of the first aspect. The data processing apparatus of the fourth aspect is characterized in that annotation image magnification change means changes the display magnification of a display image of the annotation using the magnification for each annotation data item determined by the annotation data magnification adjusting means and the display image of the annotation whose magnification has been changed is superposed in the specified annotation position on a text display image.

With such a configuration, annotation data items whose contents would be illegible because their display size is small if they were simply reduced with a specified magnification, that is, annotation data items whose display size reduced with a specified magnification is smaller than the display limit value determined by the display capability (resolution) of the display unit and the type of data (whether the annotation is of text character or of line drawing), are sensed. The smallest magnification that prevents the display size after the magnification of the annotation data items have been changed from being smaller than the display limit value is applied to the annotation data items. This enables the contents of the annotation to be displayed larger with the entire display size remaining unchanged. As a result, the user can check the contents of the annotation easily.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 12 shows the display image of the annotation input window of FIG. 11 reduced by the approach applied in the first embodiment and superposed on text;

FIGS. 16A and 16B show examples of displaying an annotation only at the top left corner of the annotation input window and also shows the display image of the annotation input window reduced by the approach applied in the first embodiment and superposed on text;

FIGS. 17A to 17D show the area obtained by removing the blank from the annotation data inputted from the annotation input window of FIGS. 16A and 16B and the annotation display image obtained by reducing the area, together with the annotation display image reduced by the approach applied in the first embodiment;

FIG. 18 shows the reduced image of the area from which the blank has been removed in FIGS. 17A to 17D, on the text display screen;

FIGS. 21A to 21C show examples of displaying a string of text characters of a small font at the top of the annotation input window, the display image of the annotation input window reduced by the approach applied in the first embodiment and superposed on text, and an example of displaying text with a larger font on the annotation display image by adjusting the magnification with the annotation data magnification adjusting section 140 of FIG. 19.

DETAILED DESCRIPTION OF THE INVENTION

Hereinafter, referring to the accompanying drawings, embodiments of the present invention will be explained.

[First Embodiment]

Figure 1:
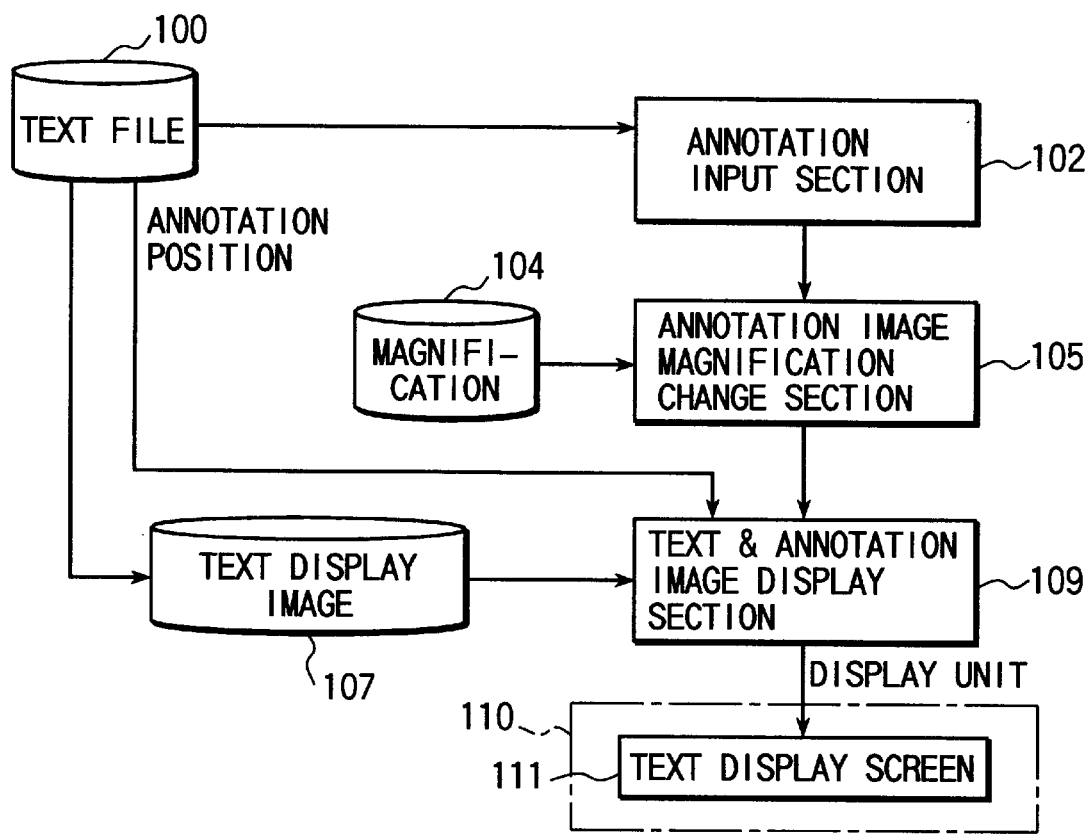
FIG. 1 is a block diagram of a schematic configuration of a data processing apparatus with an annotation display function according to a first embodiment of the present invention.

FIG. 1 is a block diagram of a schematic configuration of a data processing apparatus with an annotation display function according to a first embodiment of the present invention. In the first embodiment, for convenience of explanation, it is assumed that a preset annotation to be displayed is read from a text stored in a text file. A preset annotation to be displayed may be read from the text received via a channel from a network. Additionally, the annotation may be taken in to open the annotation input window on the text display screen, prompt the user to enter an annotation on the window with a coordinate input device, such as a tablet, reduce or enlarge the display image of the window with a specified magnification, and then display the window again. The same holds true in a second to a fourth embodiment explained later.

The "annotation" in this specification is an annotation appearing on a window (an annotation input window) different from the text window and linked to a specific position on a text. Namely, an annotation is different from an annotation that is the same as text data in terms of data expression.

Figure 2:
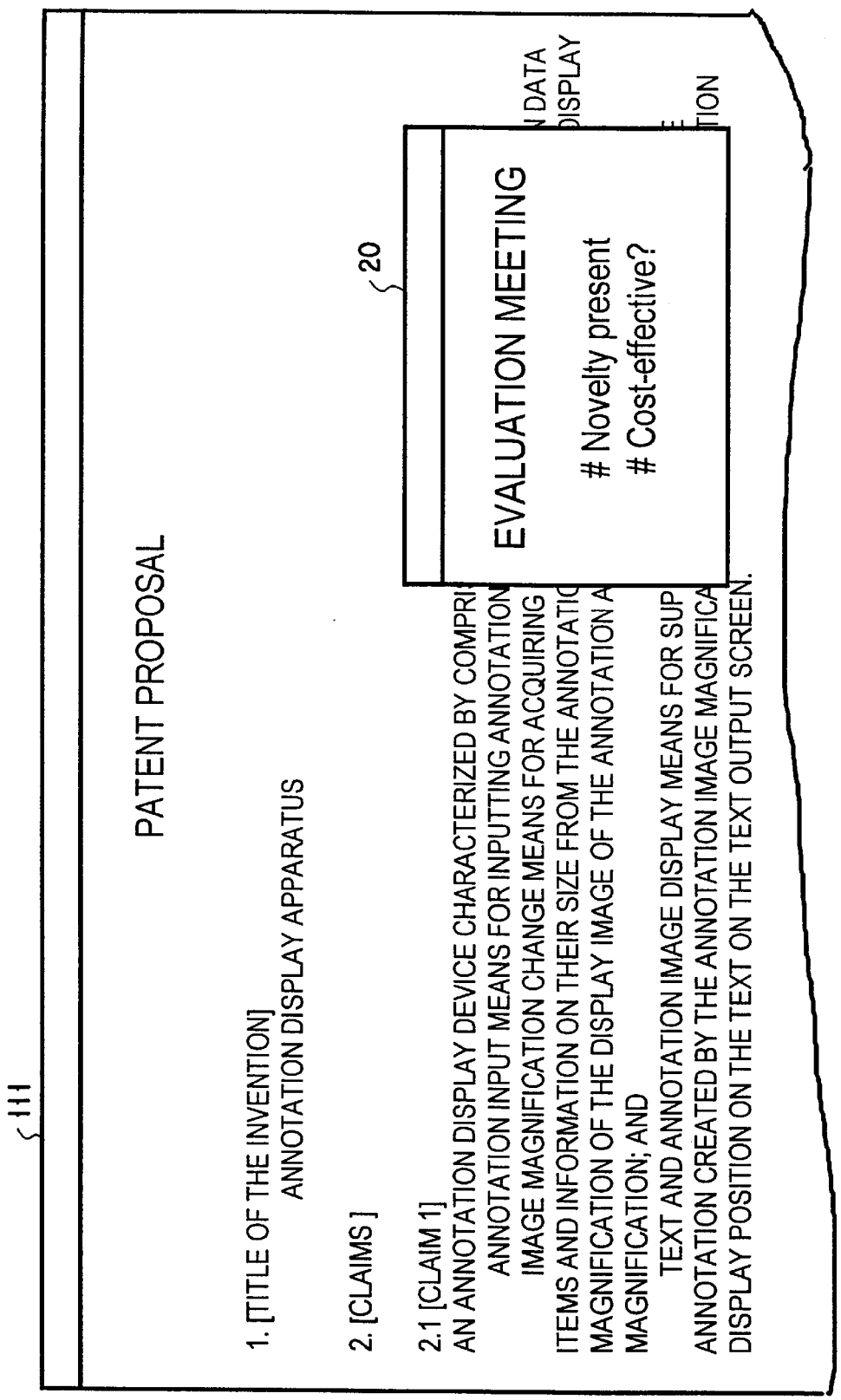
FIG. 2 is an example of displaying a text display screen and an annotation input window simultaneously.

In a text file 100, texts and annotations set in the texts, and information on the positions in which the annotations are written on the texts are stored. The annotation is set so as to correspond to the text by the user opening the annotation input window 20 on the text display screen 111 as shown in FIG. 2, entering the desired annotation data from the window 20 using the coordinate input device, and specifying the position in which the annotation is to be written. The annotation is composed of a string of coordinate values of the individual annotation data items inputted from the annotation input window 20 (when characters and graphs are entered by handwriting with the coordinate input device) or the input coordinates and code data (when characters are inputted from the keyboard), and information on the size of the annotation input window 20 at the end of the input. While the annotation input window 20 is of the fixed size when the user has opened the window on the screen, the window can be enlarged or reduced to the size determined by its bottom right end position (acting as a reference) and its top left end position, when the user moves the window's bottom right end with a pen.

The annotation input section 102 takes in the annotation set so as to correspond to the text stored in the text file 100, creates information on the positions of the individual annotation data items constituting the annotation (referred to as input annotation data items) on the annotation input window 20 and their size, and creates display annotation data made up of the information and the original annotation data.

On the basis of the display annotation data obtained from the annotation input section 102, a magnification of R preset in a magnification storage section 104, and the size of the annotation input window at the time of annotation input, the annotation image magnification change section 105 reduces or enlarges the display image (annotation display image) of the annotation input window on which the annotation has been written and creates an annotation display image with the changed magnification.

Finally, the text and annotation image display section 109 creates a display image by superposing the annotation display image with the changed magnification generated by the annotation image magnification change section 105 in the user-specified annotation writing position (annotation position) on the text display image 107 and displays it on the text display screen 111 of a display unit 110. The text display image 107 is created by a text image creating section (not shown) on the basis of the text stored in the text file 100.

With the present embodiment, the display image of the annotation can be superposed, lying on the text display image 107 on the text display screen 111. Therefore, differently from the conventional equivalent, the user can check the contents of the annotation without opening the window displaying the contents of the annotation, while reading the text.

Figure 3:
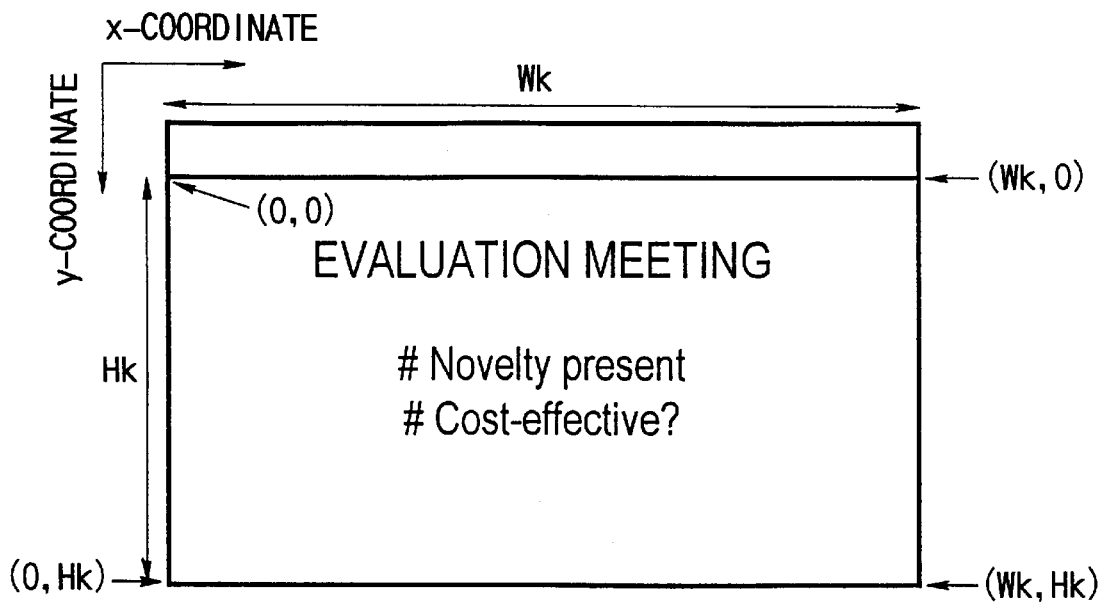
FIG. 3 is a diagram to help explain the coordinate system on the display screen applied in the first embodiment.
Figure 4:
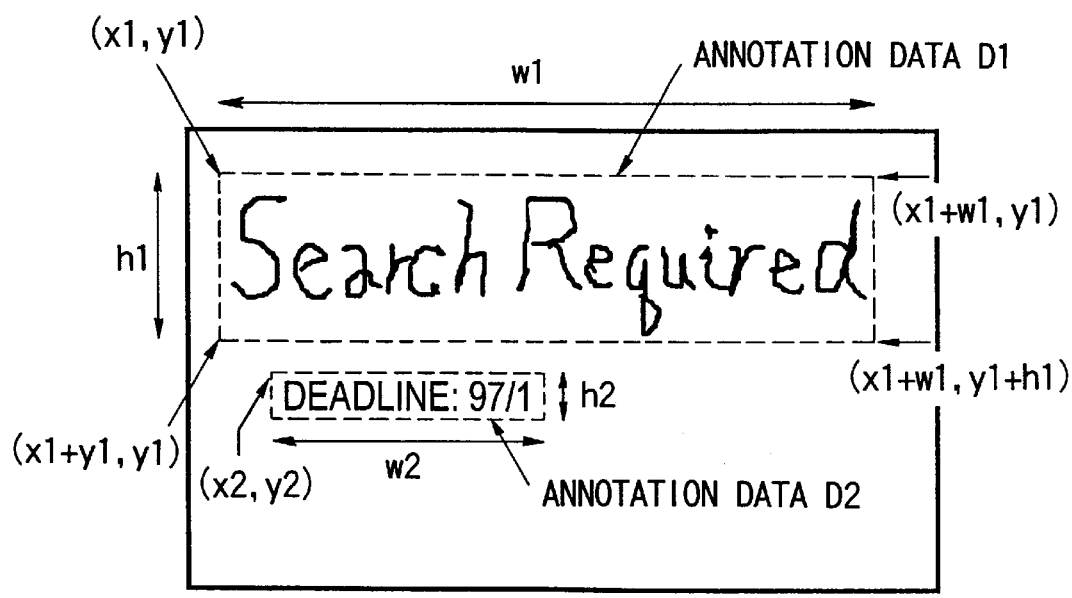
FIG. 4 is a diagram to help explain the bounding box of annotation data on the display screen applied in the first embodiment.

The coordinate system of the display screen is determined as shown in FIG. 3. The top left end of the screen is determined to be the origin (0, 0). The distance to the right of the origin is taken as the x-coordinate and the distance below the origin is taken as the y-coordinate. The right direction of the x-coordinate axis is determined to be positive and the down direction of the y-coordinate axis is determined to be positive. Here, "annotation data item" means a partial data string constituting an annotation. In FIG. 4, "Search Required," the line-drawing characters entered freehand, is one annotation data item D1, and "DEADLINE:97/1", the text character string, is another annotation data item D2.

Methods of organizing the input data items into a single annotation data item include (1) a method of organizing the input data items in the order in which the data items have been inputted, (2) a method of the user specifying the way to organize the data items after the data input, and (3) a method of the system automatically organizing the data items on the basis of the arrangement of the data items on the screen. While, in the example of FIG. 4, the freehand characters "Search Required" is a set of annotation data items (D1), they may be organized into several separate annotation data items.

Take the annotation data item as shown in FIG. 4 as in example. In the example of FIG. 4, annotation data item D1 is displayed in the area whose top left end's coordinates are (x1, y1), whose top right end's coordinates are (x1+w1, y1), whose bottom left end's coordinates are (x1, y1+h1), and whose bottom right end's coordinates are (x1+w1, y1+h1). The top left end's coordinates (x1, y1) are called the "display position" of annotation data item D1, or just called "position." A combination (x1, y1, w1, h1) of the coordinates (x1, y1) and the width (w1) and height (h1) of the annotation data item is called a bounding box of annotation data item D1.

Figure 5:
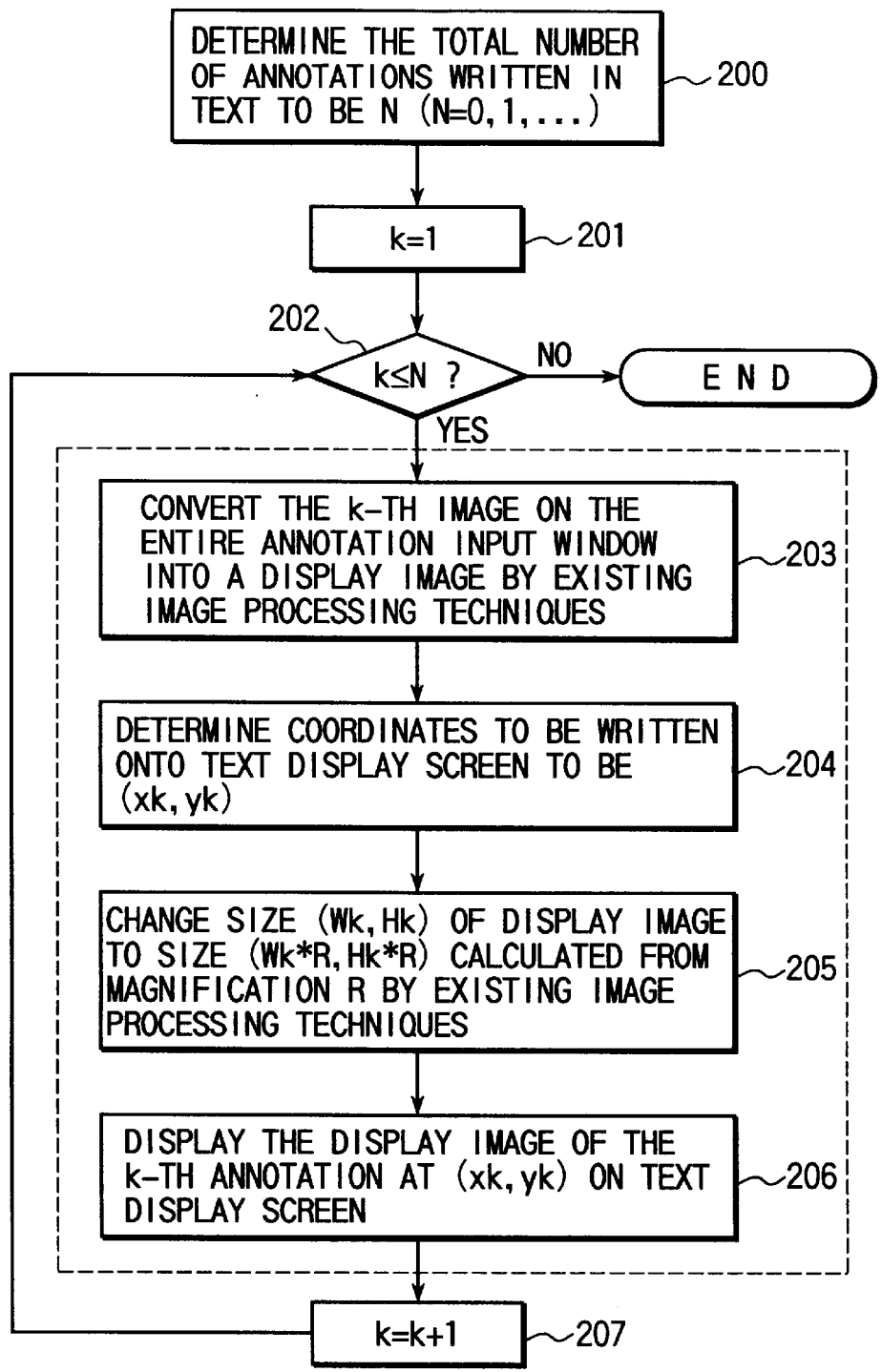
FIG. 5 is a flowchart to help explain the operation of the annotation image magnification change section 105 and the text and annotation image display section 109 in the configuration of FIG. 1.

The operation of the configuration of FIG. 1 will be described by reference to the flowchart of FIG. 5.

In general, more than one annotation can be put on text. To display the display image of more than one annotation on text, the process for displaying an annotation is repeated as many times as there are annotations. Steps 200 to 202, and step 207 are steps for the repetitive process. Steps 203 to 206 enclosed by a broken-line box indicate the process of displaying the display image of one annotation on text.

The annotation image magnification change section 105 converts the contents of the annotation input window 20 entered by the user from the window into a display image by existing image processing techniques (step 203). Namely, the annotation image magnification change section 105 creates a screen image (an annotation display image) at the time when the user has entered an annotation from the annotation input window 20 by image-developing all the annotation data items of the annotation.

Then, on the basis of the magnification R (a magnification once the original is determined to be 1) indicted by the magnification storage section 104, the annotation image magnification change section 105 reduces or enlarges the annotation display image to the size (Wk*R, Hk*R) by existing image processing techniques (steps 204 and 205).

The text and annotation image displaying section 109 superposes the annotation display image whose magnification has been changed at the annotation image magnification change section 105 on the text display image 107 in the annotation position (xk, yk) on the text display screen 111 specified by the user for the relevant annotation stored in the text file 100 (step 206).

If the total number of annotations is N, the above processes will be repeated N times from k=1 to k=N (steps 200 to 202, step 207).

In the explanation, the magnification (the magnification of the annotation display image) of the annotation input window has been changed at the annotation image magnification change section 105 by the first approach of imaging the entire annotation input window and then reducing or enlarging the whole image. The magnification may be changed by the second approach of reducing or enlarging each of the individual images constituting the annotation.

Figure 6:
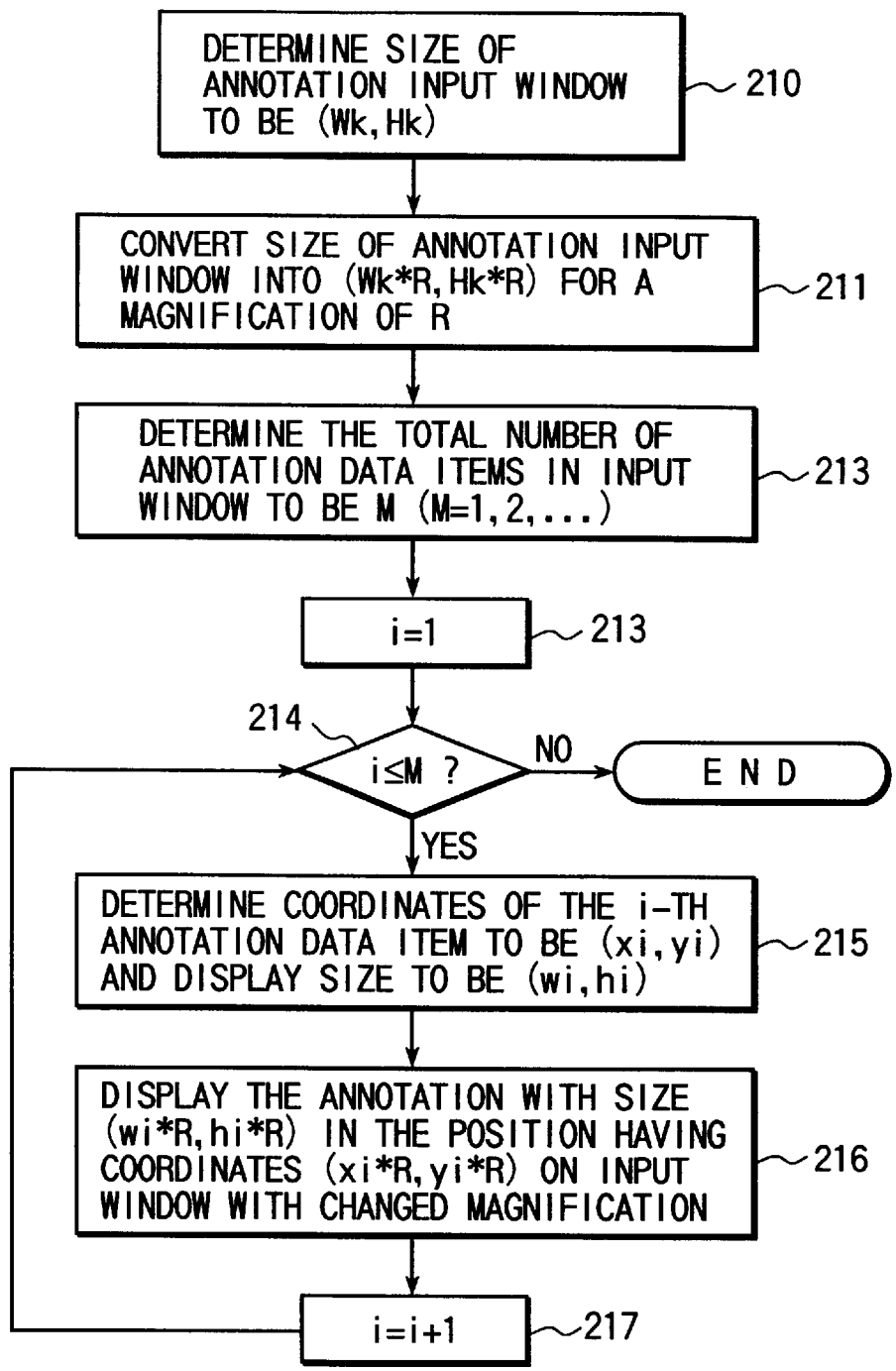
FIG. 6 is a flowchart to help explain the operation of the annotation image magnification change section 105 and the text and annotation image display section 109 in a case where an approach different from that of FIG. 5 is applied.

Hereinafter, the operation of the annotation image magnification change section 105 and the text and annotation image display section 109 by the second approach (corresponding to the processing routine enclosed by a broken-line box in the flowchart of FIG. 5) will be explained by reference to a flowchart in FIG. 6.

The annotation image magnification change section 105 determines the size of the display image whose magnification of the annotation input window displayed on the text display screen 111 to be (Wk*R, Hk*R) from the size (Wk, Hk) of the annotation input window 20 and magnification R (steps 210, 211).

Next, the annotation image magnification change section 105 converts the coordinates (xi, yi) of the i-th (i is in the range of 1 to M) annotation data item on the annotation input window 20 before the change of magnification into the coordinates (xi*R, yi*R) on the annotation window after the change of magnification (at steps 210, 211) on the basis of the size (wi, hi) of the display image of the annotation data item. The annotation image magnification change section also changes the size of the display image (annotation display image) of the annotation data item with a magnification of (wi*R, hi*R). Receiving this, the text and annotation image display section 109 displays the display image of the i-th annotation data item with a size of (wi*R, hi*R) at the coordinates (xi*R, yi*R) on the annotation input window with the changed magnification (steps 215, 216).

The above processes are repeated M times for each annotation data item, starting i=1 up to M (steps 212 to 214, step 217).

Figure 7:
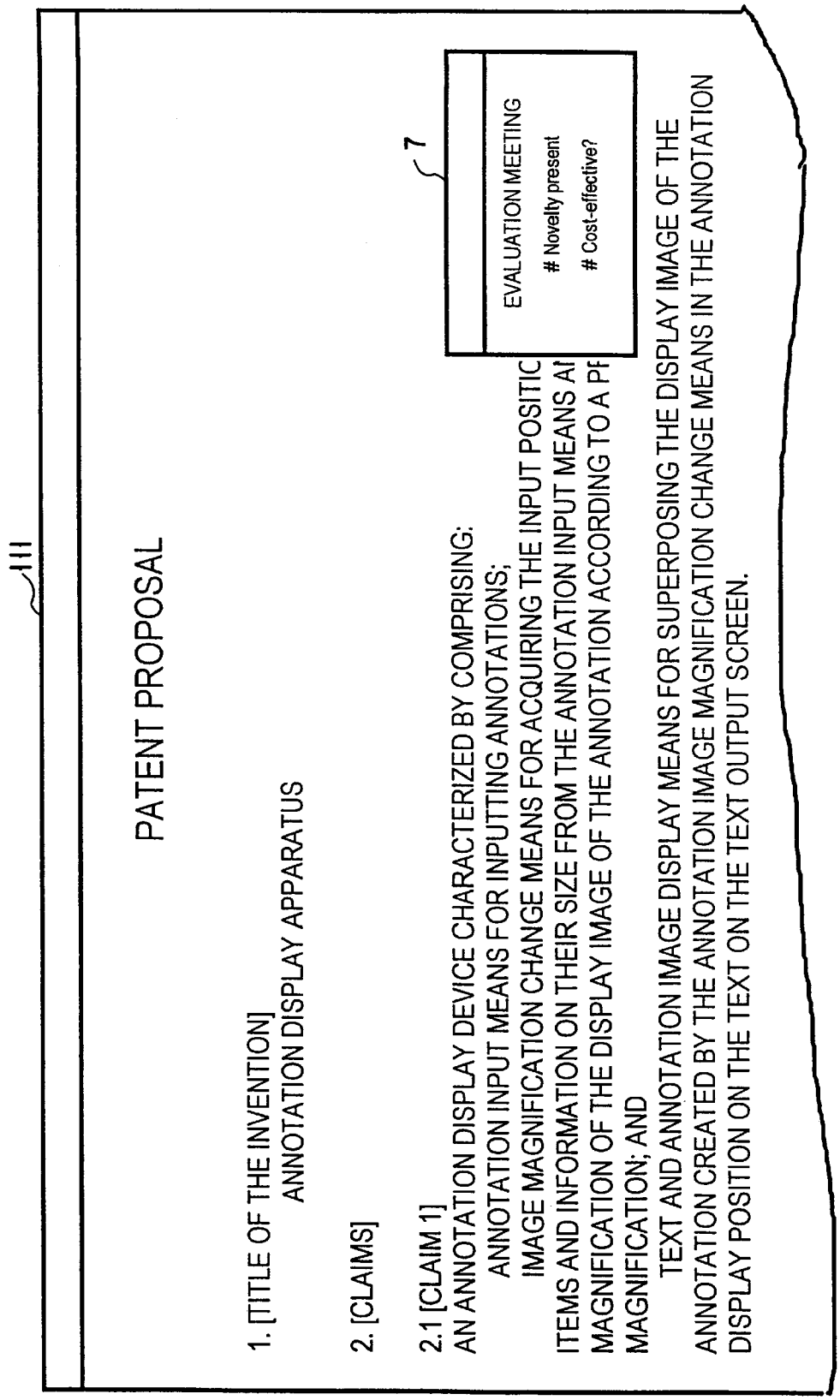
FIG. 7 shows an example of text and an annotation display image appearing one on top of the other in the configuration of FIG. 1.

As described above, the annotation image magnification change section 105 creates an annotation display image by changing the magnification of the display image of the annotation input window 20 by one of the aforementioned approaches. The text and annotation image display section 109 superposes the annotation display image with the changed magnification on the annotation display image 107 on the text display screen 111. This enables the display image (the annotation display image with the changed magnification) 7 indicating the contents of the annotation to be displayed on the text display screen 111 as shown in FIG. 7, when the annotation has been entered as shown on the annotation input window 20, for example. FIG. 7 shows an example of the screen on which the annotation entered on the annotation input window 20 of FIG. 2 has been displayed with a magnification of 0.5 (R=0.5).

[Second Embodiment]

Figure 8:
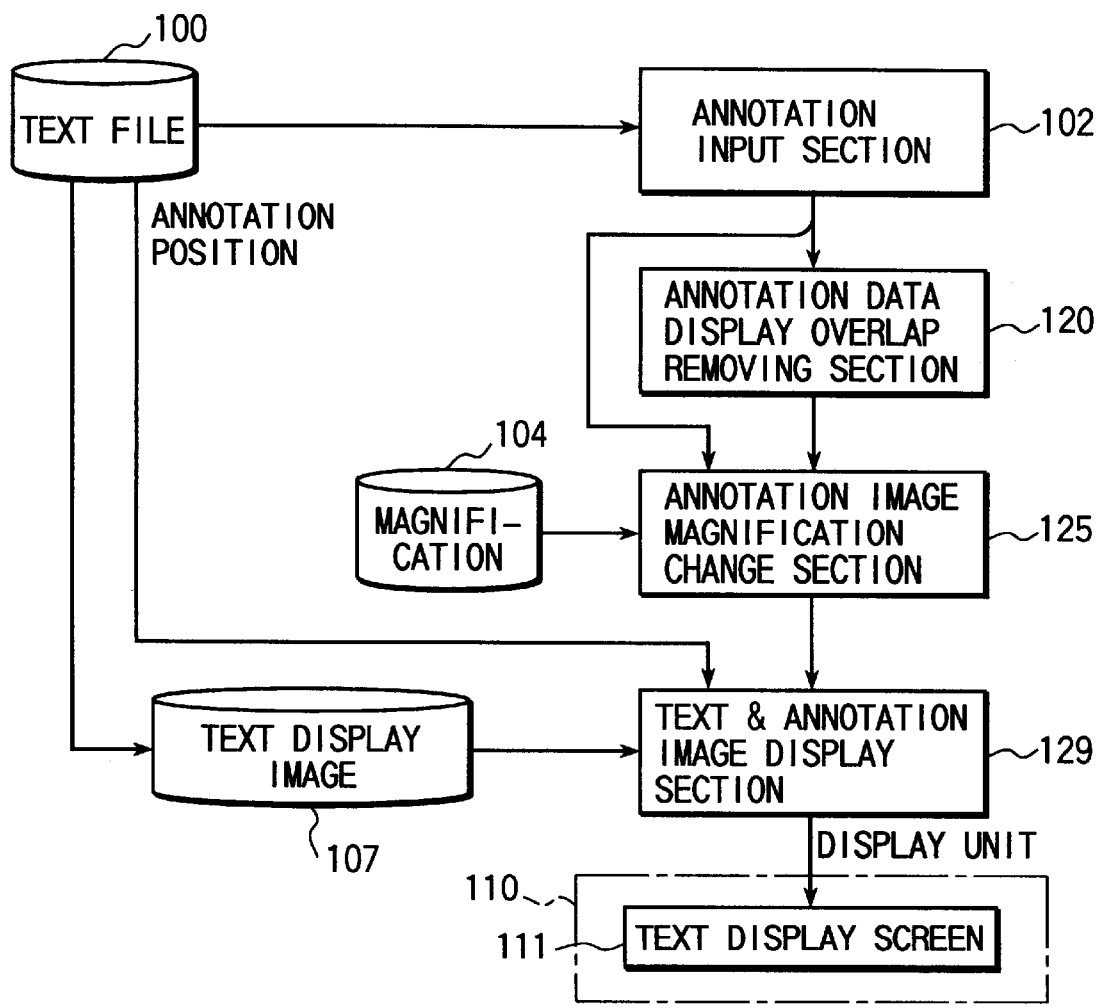
FIG. 8 is a block diagram of a schematic configuration of a data processing apparatus with an annotation display function according to a second embodiment of the present invention.

FIG. 8 is a block diagram of a schematic configuration of a data processing apparatus with an annotation display function according to a second embodiment of the present invention. In FIG. 8, the same parts as those in FIG. 1 are indicated by the same reference symbols.

The data processing apparatus of FIG. 8 differs from that of FIG. 1 in that an annotation data display overlap removing section 120 that senses an area where representations of two or more annotation data items overlap with each other is added and that an annotation image magnification change section 125 and a text and annotation image display section 129 that differ partially in processing function from the annotation image magnification change section 105 and text and annotation image display section 109 are provided instead of the latter.

Figure 9:
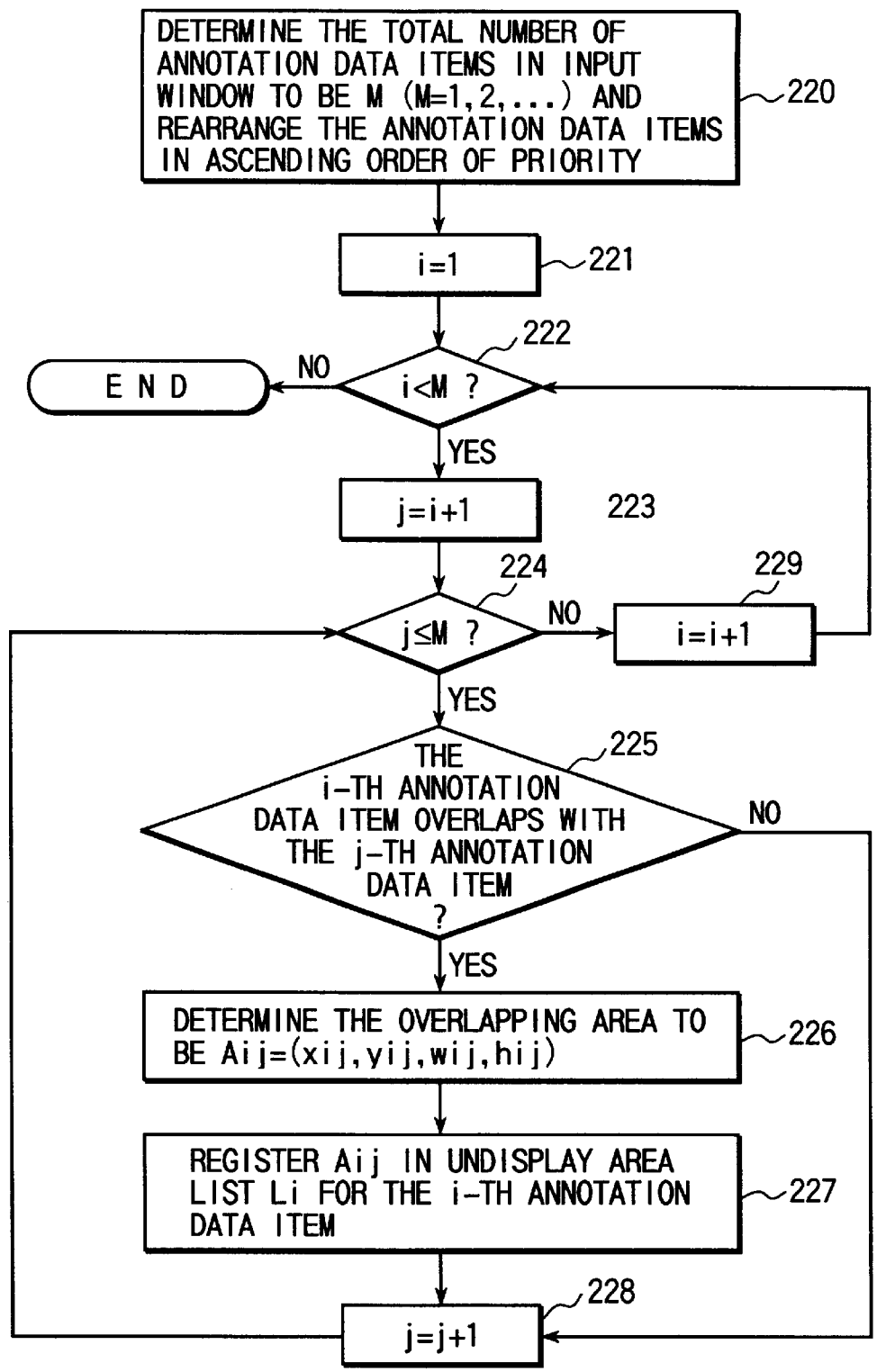
FIG. 9 is a flowchart to help explain the operation of the annotation data display overlap removing section 120 of FIG. 8.
Figure 10:
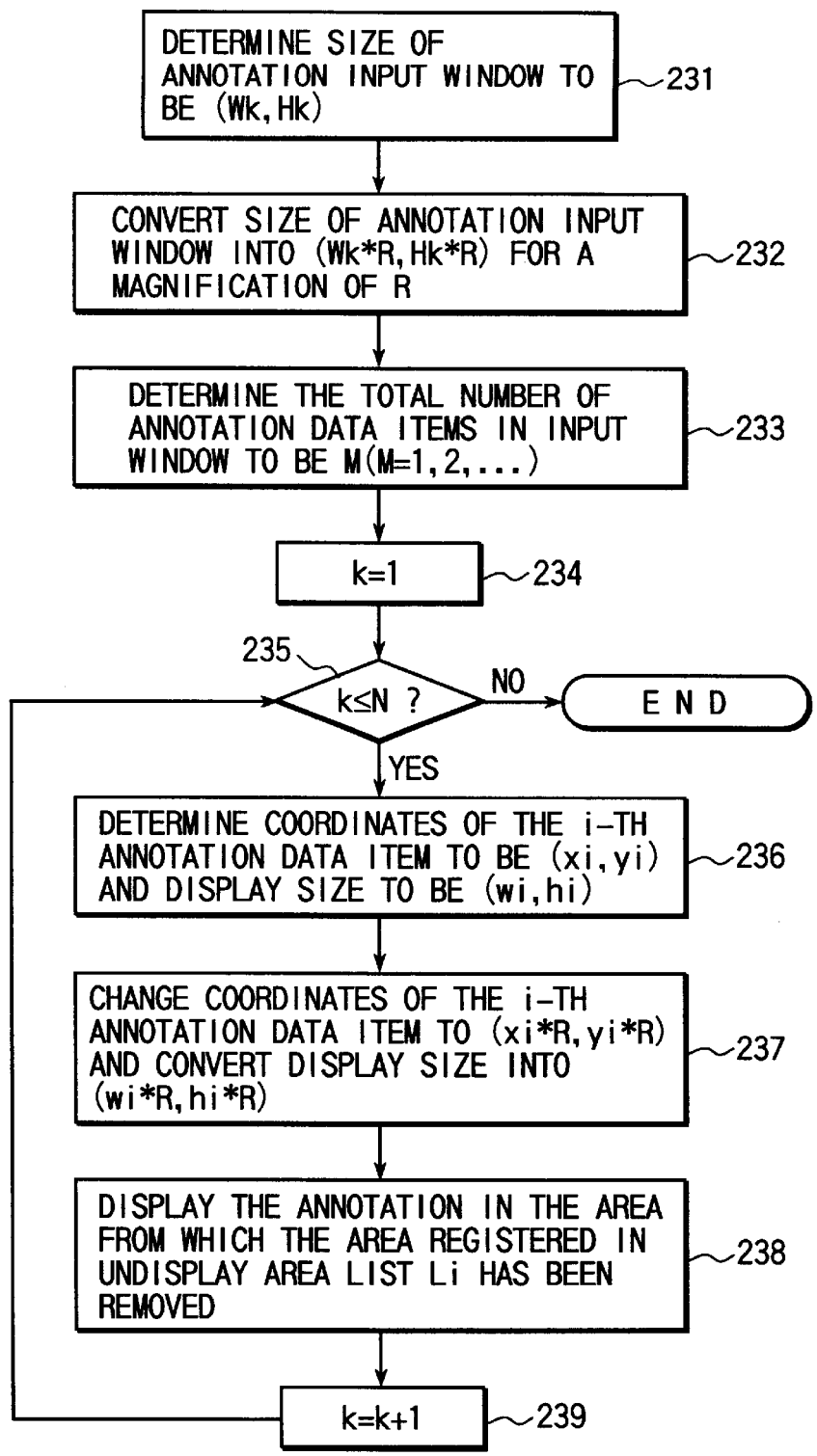
FIG. 10 is a flowchart to help explain the operation of the annotation image magnification change section 125 and the text and annotation image display section 129 in the configuration of FIG. 8.

Hereinafter, the operation of the configuration of FIG. 8 will de described by reference to flowcharts in FIGS. 9 and 10.

The annotation input section 102 reads the annotation set so as to correspond to a text stored in the text file 100, creates information on the positions and size of the individual input annotation data items constituting the annotation, and creates display annotation data made up of the information and the original annotation data.

When the annotation input section 102 has created an M number of display annotation data items, the annotation data display overlap removing section 120 rearranges the annotation data items in ascending order of priority given to the type of data beforehand (e.g., when text overlaps with a line drawing, the text has priority over the drawing) (step S220). Note data items having the same priority level may be arranged in the order in which they have been entered (earliest or latest) or any other order. The rearrangement may be made in the order in which, for example, the annotation data items have been entered (earliest or latest).

The annotation data display overlap removing section 120 sets the i-th annotation data item, starting with the beginning annotation data item (steps 221, 222, 229) and senses an area (a rectangular area) Aji=(xij, yij, wij, hij) where the i-th (i is in the range of 1 to M−1) annotation data item overlaps with the j-th (j is in the range of i+1 to M) annotation data item after the (i+1)-th one, on the basis of the positions and size of both of the annotation data items (steps 225, 226).

The overlap ping of the annotation data items can be judged through the following procedure. It is assumed that annotation data item A and annotation data item B have a bounding box of (x1, y1, w1, h1) and that of (x2, y2, w2, h2), respectively.

In this case, if none of the following four expressions hold, it is found that annotation data item A overlaps with annotation data item B in display area:

$$x1 \geq x2+w2$$

$$x1+w1 \leq x2$$

$$y1 \geq y2+h2$$

$$y1+h1 \leq y2$$

At this time, it is found that the overlapped area Aij is a rectangular area of (X1, Y1, X2-X1, Y2-Y1),
where X1=max (x1, x2)
X2=min (x1+w1, x2+w2)
Y1=max (y1, y2)
Y2=min (y1+h1, y2+h2)
min (a, b) is a function that returns the smaller of a and b, and
max (a, b) is a function that returns the larger of a and b.

When sensing area Aij where the j-th annotation data item overlaps with the i-th annotation data item, the annotation data display overlap removing section 120 changes the display image of annotations so that only (the display image of the relevant portion of) the j-th annotation data item (having a higher level of priority) may be selected from the overlapped annotation data items and be displayed (step 227). This process is realized by registering (information on) area Aij in an undisplay area list Li prepared for the i-th annotation data item. The information on area Aij in the list Li indicates that the image portion of area Aij is made undisplayed in displaying the display image of the i-th annotation data item.

The annotation data display overlap removing section 120 repeats the processes at steps 225 to 227, while changing the annotation data items to be checked for an overlap of display with the i-th annotation data item, starting with j=i+1 up to M (steps 224, 228). Specifically, the annotation data display overlap removing section 120 not only senses the display overlapping of the (i+1)-th or later annotation data item with the i-th annotation data item, but also changes the display image of annotations when finding the overlapping so that only the relevant (i+1)-th or later annotation data item may be displayed.

The annotation data display overlap removing section 120 repeats the series of processes, while changing the i-th annotation data item one by one, starting with i=1 up to M−1 (steps 222, 229).

In this way, the annotation data display overlap removing section 120 acquires information on area Aij where annotation data items overlap with each other and the annotation data item to be displayed in the area. In the present embodiment, instead of creating a combination of "overlapping area Aij=(xij, yij, wij, hij), annotation data item to be displayed," the data "undisplay area list Li" indicating area Aij not to be displayed in the annotation data item is created. In this case, because all of the M-th annotation data item is displayed, area Aij is not registered in the undisplay area list Li (=LM) for the M-th annotation data item. Therefore, the undisplay area list Li (=LM) may not be prepared.

When the number of annotations is plural, the annotation data display overlap removing section 120 creates an undisplay area list Li of each annotation data item for all of the annotations.

When the annotation data display overlap removing section 120 has created an undisplay area list Li of each annotation data item for one annotation, the annotation image magnification change section 125 creates an annotation display image by reducing or enlarging the display image on the basis of the size of the annotation input window at the time when the annotation was entered, the display annotation data item created by the annotation input section 102, the magnification R indicated by the magnification storage section 104, and the undisplay area list Li of each annotation data item created by the annotation data display overlap removing section 120 (i.e., information on the area where annotation data items overlap with each other and an annotation data item to be displayed in the area).

Then, the text and annotation image display section 129 creates a display image where the annotation display image of each annotation data item with the changed magnification is superposed in the user-specified annotation position on the text display image 107, and displays it on the text output screen 111.

The operation of processing one annotation with the annotation image magnification change section 125 and the text and annotation image display section 129 will be explained by reference to a flowchart in FIG. 10.

The annotation image magnification change section 125 determines the size of the annotation display image with the changed magnification of the annotation input window displayed on the text display screen 111 to be (Wk*R, Hk*R) from the size (Wk, Hk) of the annotation input window 20 and, magnification R (steps 231, 232).

Next, the annotation image magnification change section 125 converts the coordinates (xi, yi) of the i-th (i is in the range of 1 to M) annotation data item on the annotation input window 20 before the change of magnification into the coordinates (xi*R, yi*R) on the annotation input window after the change of magnification (at steps 231, 232) on the basis of the size (wi, hi) of the display image of the annotation data item. The annotation image magnification change section also changes the size of the display image of the annotation data item to size (wi*R, hi*R) (steps 236, 237).

At this time, the annotation image magnification change section 125 checks to see if (information on) area Aij has been registered in the undisplay area list Li for the i-th annotation data item created by the annotation data display overlap removing section 120. If it has been registered, the annotation image magnification change section also changes the magnification of all of the registered areas Aij (with a width of wij and a height of hij) using a magnification of R. For the sake of convenience, area Aij with the changed magnification is called area Aij*R. Then, the annotation image magnification change section 125 creates an annotation display image by removing the portion of area Aij*R from the annotation display image with the size (wi*R, hi*R).

Then, the text and annotation image display section 129 displays the annotation display image whose magnification has been changed to the size (wi*R, hi*R) of the i-th annotation data item in such a manner that the portion of area Aij*R has been removed from the annotation display image, using the coordinates (xi*R, yi*R) on the annotation input window 20 whose magnification has been changed by the annotation image magnification change section 125 as a reference (step 238).

The above processes are repeated M times for each annotation data item, starting with i=1 up to M (steps 233, 234, 239).

Even when the annotations entered by the user have a portion where two or more data items overlap with each other, the repetition of the aforesaid processes can remove the overlap in providing a reduced display, for example. This enables the user to imagine the contents of the annotation more accurately from the display image of the annotation.

Figure 11:
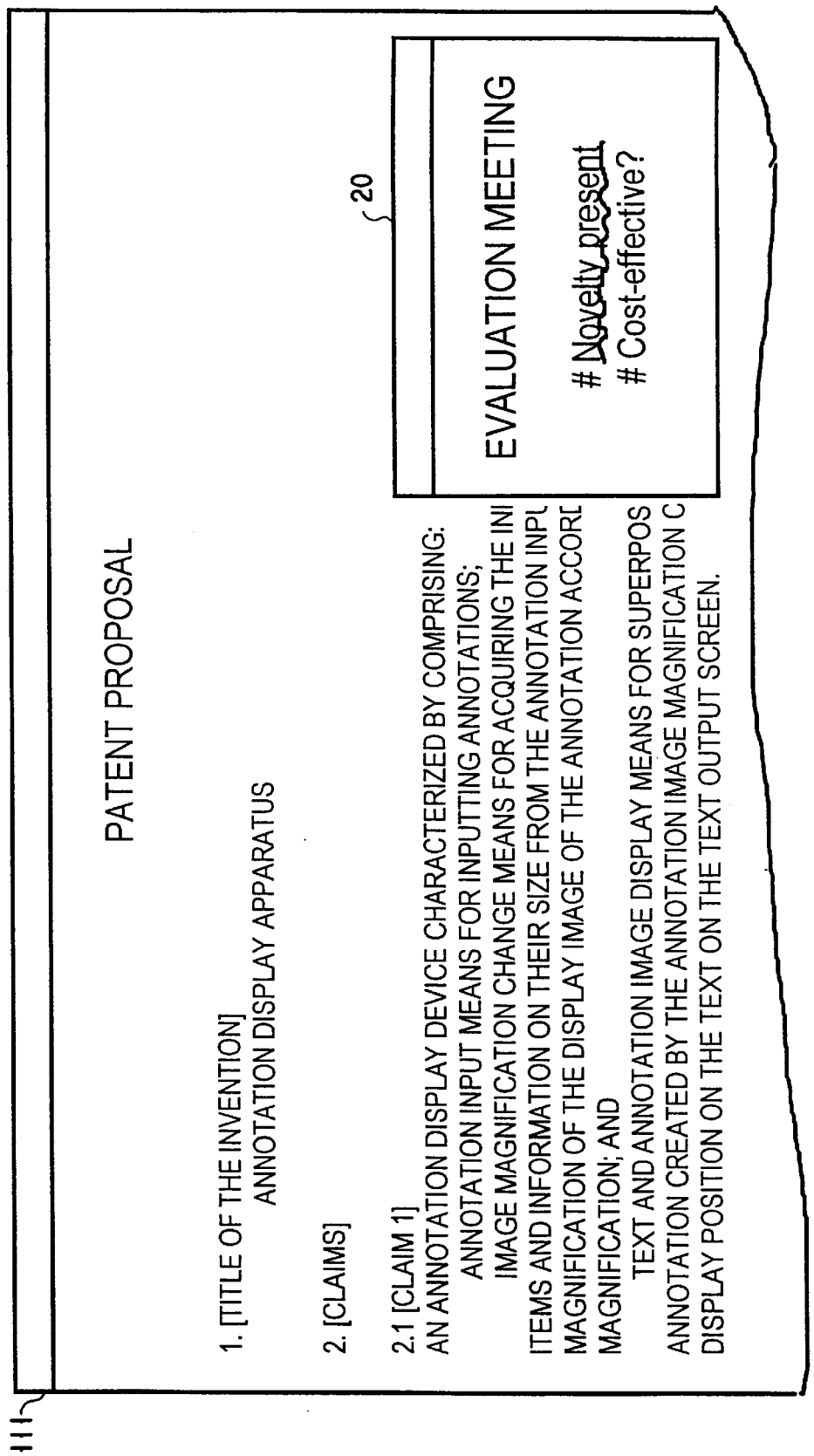
FIG. 11 shows an example of displaying a text display screen and an annotation input window simultaneously.

A concrete example of removing such an overlap will be described by reference to a case where a line drawing (a handwritten wavy line) is written over text (the text character string "NOVELTY PRESENT") as shown in FIG. 11.

First, simply reducing the annotation inputted onto the annotation input window 20 of FIG. 11 gives an annotation display image 12 as shown in FIG. 12. Because the display character size of the test character string of the annotation on the screen of FIG. 11 is large, the contents of the annotation can be understood sufficiently, even if a line drawing is written over the annotation. When the annotation is reduced as shown in FIG. 12, however, the display character size of the text character string gets smaller to the extent that the line drawing overlaps with the text character string, making the characters illegible.

When an annotation data item having the positional relationship as shown in FIG. 11 has been given, the annotation data display overlap removing section 120 senses an area where the line drawing overlaps with text in display and makes a change so that only one annotation data item may be displayed in the overlapping area. Suppose that text is allowed to appear in the area where the text and line drawing overlap with each other in FIG. 11. When the magnification is not changed, an annotation display image will be displayed as shown in FIG. 13A.

Figure 13A:
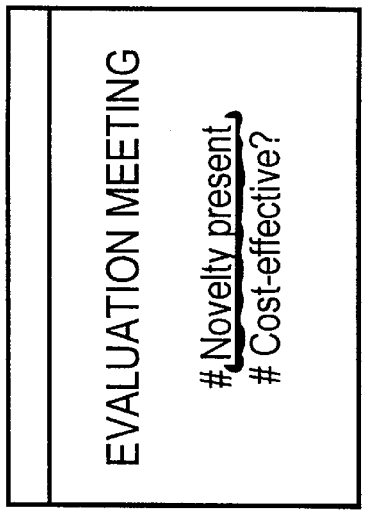
FIGS. 13A and 13B show the annotation display image from which the overlap of the annotation data items entered from the annotation input window of FIG. 11 has been removed by the annotation data display overlap removing section 120 and also shows the annotation display image reduced and displayed on the text display screen.
Figure 13B:
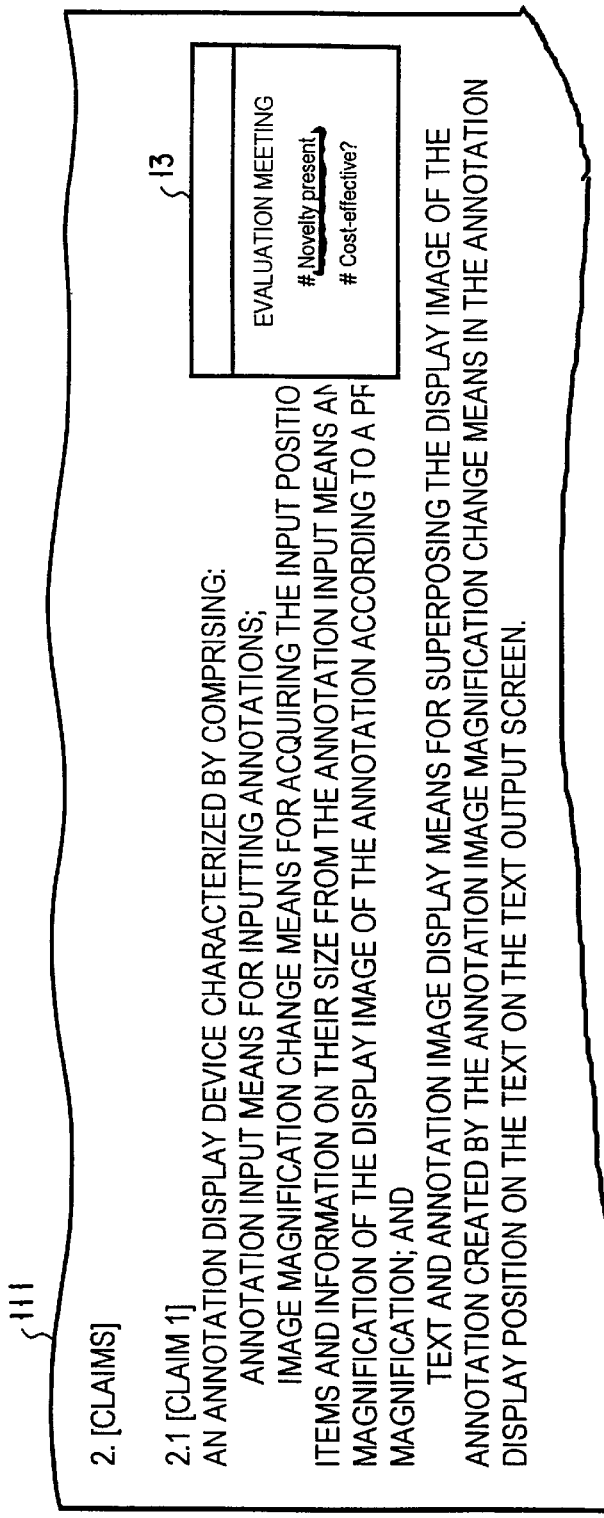

When the magnification R is set at 0.5, the annotation image magnification change section 125 creates an annotation display image by reducing the annotation display image of FIG. 13A with a magnification of 0.5 on the basis of the display image of the annotation input window 20 of FIG. 11, information on the change of the display state of the overlapping area created by the annotation data display overlap removing section 120 (information indicating that the annotation data item forming the line drawing in the overlapping area is to be removed and made undisplayed), and a magnification of 0.5. Then, the annotation image magnification change section displays the resulting annotation display image in the user-specified annotation position as a reduced annotation display image 13 as shown in FIG. 13B.

[Third Embodiment]

Figure 14:
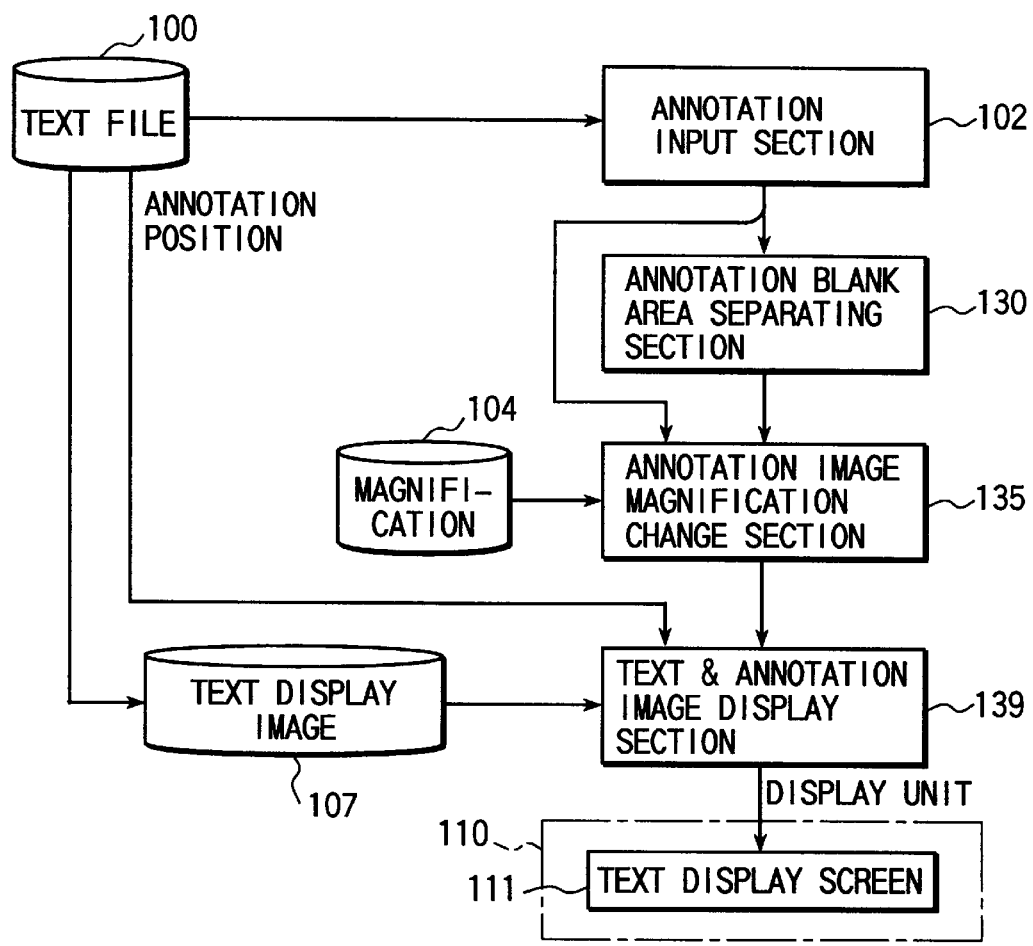
FIG. 14 is a block diagram of a schematic configuration of a data processing apparatus with an annotation display function according to a third embodiment of the present invention.

FIG. 14 is a block diagram of a schematic configuration of a data processing apparatus with an annotation display function according to a third embodiment of the present invention. In FIG. 14, the same parts as those in FIG. 1 are indicated by the same reference symbols.

The data processing apparatus of FIG. 14 differs from that of FIG. 1 in that an annotation blank area separating section 130 is added which senses a bounding box for annotation data items on the annotation input window and separates a blank in which annotation data items are not included from the other area (the area in which one or more annotation data items are included) and in that an annotation image magnification change section 135 and a text and annotation image display section 139 that differ partially in processing function from the annotation image magnification change section 105 and text and annotation image display section 109 are provided instead of the latter.

In the configuration of FIG. 14, the annotation input section 102 reads the annotation set so as to correspond to a text stored in the text file 100, creates information on the positions and size of the individual input annotation data items constituting the annotation on the annotation input window 20, and creates display annotation data made up of the information and the original annotation data.

The annotation blank area separating section 130 senses a bounding box of annotation data items on the annotation input window on the basis of the positions and size of the display annotation data items created by the annotation input section 102 and creates information (annotation blank separation information) used to separate a blank indicating an area including no annotation data item from the other area (the area including one or more annotation data items). The annotation blank area separating section 130 performs this process on each of the annotation data items constituting one annotation.

The annotation image magnification change section 135 creates an annotation display image by reducing or enlarging the display image on the annotation input window on the basis of the display annotation data created by the annotation input section 102, the magnification R indicated by the magnification storage section 104, the size of the annotation input window at the time when the relevant annotation has been entered, and each piece of the annotation blank separation information for each annotation data item created by the annotation blank area separating section 130.

Then, the text and annotation image display section 139 creates a display image where the annotation display image with the changed magnification is superposed in the user-specified annotation position on the text display image 107, and displays it on the text output screen 111.

As described above, when an annotation display image whose magnification has been changed, for example, a reduced annotation display image, is created on the text display screen 111, reducing only the portion of the area where the annotation data actually exists enables the annotation data in the reduced annotation display image to be made larger, even when the size of the reduced annotation display image is the same as in the first embodiment. This enables the user to imagine the contents of the annotation more accurately from the display image of the annotation.

Figure 15:
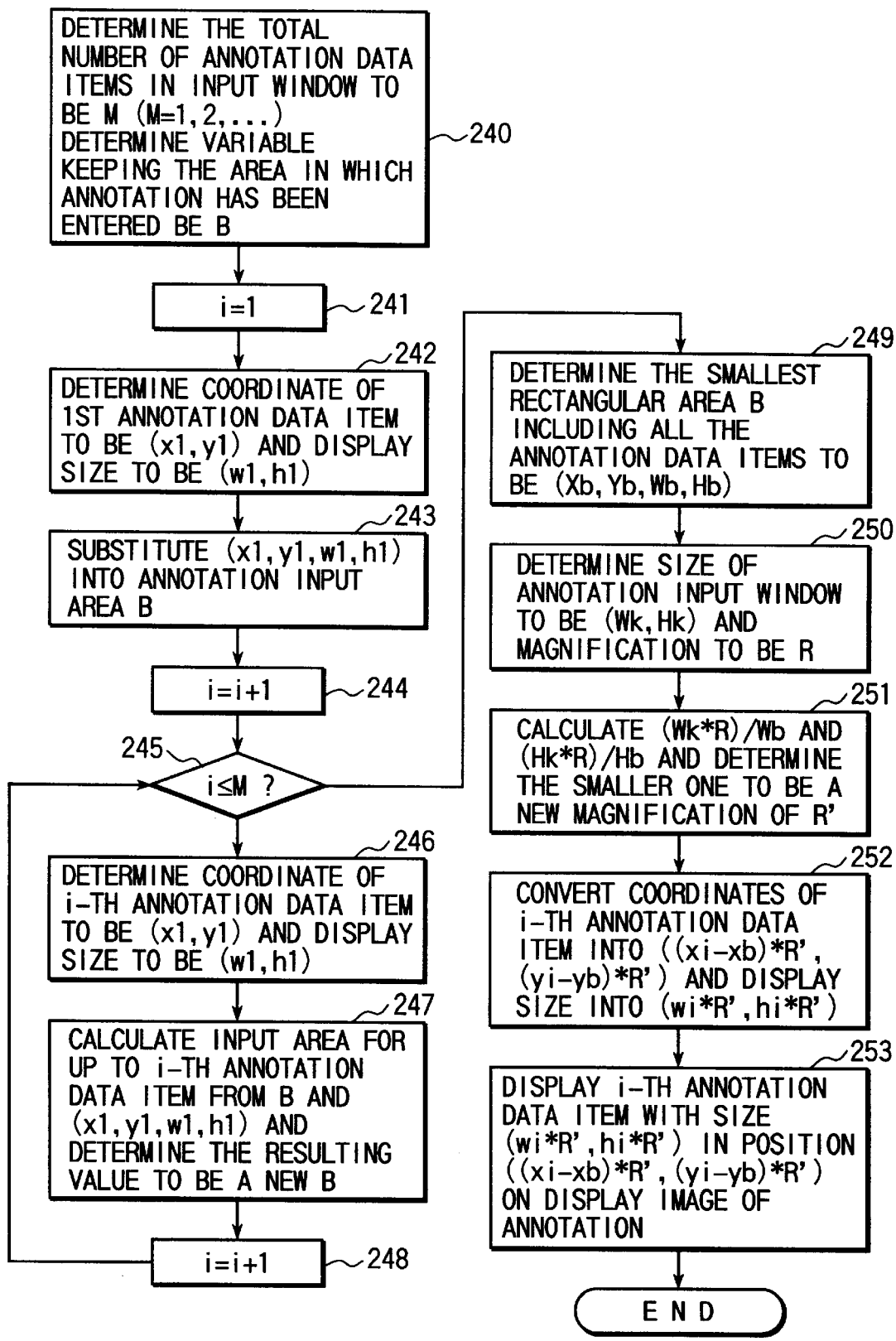
FIG. 15 is a flowchart to help explain the operation of the annotation blank area separating section 130, the annotation image magnification change section 135, and the text and annotation image display section 139 in the configuration of FIG. 14.

The most distinctive operation of the annotation blank area separating section 130 in the third embodiment will be described by reference to a flowchart in FIG. 15.

It is assumed that when an annotation data item has been written only in an area (about one-fourth of the annotation input window) at the top left end of the annotation input window (20), the display image of the annotation input window is reduced and displayed in the area where the size of the annotation input window is reduced with a magnification of 0.5.

In this case, when the display image of the annotation input window of FIG. 16A is simply reduced and displayed, a reduced annotation display image 16 as shown in FIG. 16B is shown. In the display of the annotation display image 16, the line-drawing character string (the handwritten character string "Search Required") is crushed, making it difficult to imagine the contents of the annotation from the reduced image.

When receiving the annotation data (annotation data composed of the handwritten character string "INVESTIGATION NEEDED" and annotation data composed of the text character string "DEADLINE: 97/1") indicating the annotation as shown in FIG. 16A from the annotation input section 102, the annotation blank area separating section 130 extracts the area (the smallest rectangular area) in which all of the annotation data items have been inputted on the annotation input window on the basis of the positions (xi, yi) of each data item on the annotation input window and the size (wi, hi) of each data item (step 240 to 248).

The area in which all of the annotation data items (two annotation data items in the example of FIG. 16A) can be calculated is described through the following procedure.

Suppose the coordinates of data items in the annotation of FIG. 16A are given as shown in FIG. 4. In the figure, two annotation data items D1 and D2 have been inputted. If annotation data items D1 and D2 have the bounding box (x1, y1, w1, h1) and the bounding box (x2, y2, w2, h2), the smallest rectangular area in which annotation data items D1, D2 have been inputted will be given as a rectangular box having the bounding box (X1, Y1, X2-X1, Y2-Y1) (step 247), where X1=min (x1, x2)

X2=max (x1+w1, x2+w2)

Y1=min (y1, y2)

Y2=max (y1+h1, y2+h2)

min (a, b) is a function that returns the smaller of a and b, and max (a, b) is a function that returns the larger of a and b.

Although there are only two annotation data items in FIG. 4 (FIG. 16A), when there are three or more annotation data items, the smallest rectangular area in which all of the annotation data items have been entered can be calculated by repeating the same process (step 247) between the input area (X1, Y1, X2-X1, Y2-Y1) obtained through the preceding procedure and the third annotation data item's bounding box (steps 245 to 248).

The annotation blank area separating section 130 extracts the smallest rectangular area in which all of the annotation data items have been inputted on the annotation input window (i.e., including all of the annotation data input areas). This triggers the annotation image magnification change section 135.

The annotation image magnification change section 135 finds the size of the annotation display image at the time when the annotation input window has been reduced with a magnification of R and reduces the display image of the area extracted by the annotation blank area separating section 130 with a magnification of R' that allows the display image to fit into the size (steps 249 to 252).

If the size of the annotation input window is (Wk, Hk), the magnification indicated by the magnification storage section 104 is R, the area extracted by the annotation blank area separating section 130 is (Xb, Yb, Wb, Hb) (steps 249, 250), the magnification R' can be calculated as "THE SMALLER OF (Wk*R)/Wb, (Hk*R)/Hb" (step 251).

On the basis of the size (wi, hi) of the display image of the annotation data item, the magnification R', and the area (Xb, Yb, Wb, Hb) extracted by the annotation blank area separating section 130, the annotation image magnification change section 135 converts the coordinates (xi, yi) on the window before the change of magnification into the coordinates ((xi−Xb)*R', (yi−Yb)*R'). The annotation image magnification change section changes the size of the display image of the annotation data to (wi*R', hi*R') (step 252).

Then, the text and annotation image display section 139 displays the display image of the relevant annotation data item with the size (wi*R', hi*R') in the position having the coordinates ((xi−Xb)*R', (yi−Yb)*R1) whose magnification has been changed by the annotation image magnification change section 135 (step 253).

The processes at steps 252, 253 (like steps 237, 238 in FIG. 10) are repeated for all of the annotation data items inputted on the annotation input window. In the flowchart of FIG. 15, the steps indicating the repetition (corresponding to steps 235, 239 in FIG. 10) are omitted for the sake of drawing.

FIGS. 17A to 17D show concrete examples of the above operation. It is assumed that when the annotation data composed of the handwritten character string "Search Required" and the annotation data composed of the text character string "DEADLINE: 97/1" have been written in the area at the top left end of the annotation input window, the display image of the annotation input window is reduced and displayed in the area where the size of the annotation input window has been reduced with a magnification of 0.5.

In this case, the annotation blank area separating section 130 extracts from the annotation input window the smallest rectangular area in which the two annotation data items have been entered, that is, the rectangular area from which a blank area has been removed, as shown in FIG. 17B.

Then, such a magnification of R' is calculated as enables the display image of the two annotation data items in the area to fit into the size (Wk*R, Hi*R) of the annotation display image on the annotation input window reduced with the magnification R (=0.5). Then, the display image of the annotation data item is reduced and displayed with the magnification R'.

The display image of the annotation data item reduced with the magnification R' in the area of the size of the annotation input window reduced with the magnification R (=0.5) is as shown in FIG. 17D. In contrast, the display image of the annotation data item simply reduced with the original magnification R (=0.5) is as shown in FIG. 17C.

As described above, with the third embodiment, even when the size of the area in which the display image of the annotation data item reduced with the magnification R' of FIG. 17D is displayed is the same as the size of the display image of the annotation data item reduced with the magnification R of FIG. 17C, the display image of FIG. 17D is easier to see than the display image of FIG. 17C, because the magnification R' for the area extracted by the annotation blank area separating section 130 is larger than the original magnification R.

Adjusting the magnification as described above causes the annotation of FIG. 16A to be reduced to the annotation display image 18 as shown in FIG. 18. The reduced annotation display image 18 is shown in the user-specified annotation position on the text display screen 111.

With the third embodiment, by limiting the area of annotation data items to be displayed, the contents of the annotation can be displayed so that they may be larger and easier to see, even when the size of the reduced annotation display image itself is the same as in the first embodiment.

[Forth Embodiment]

Figure 19:
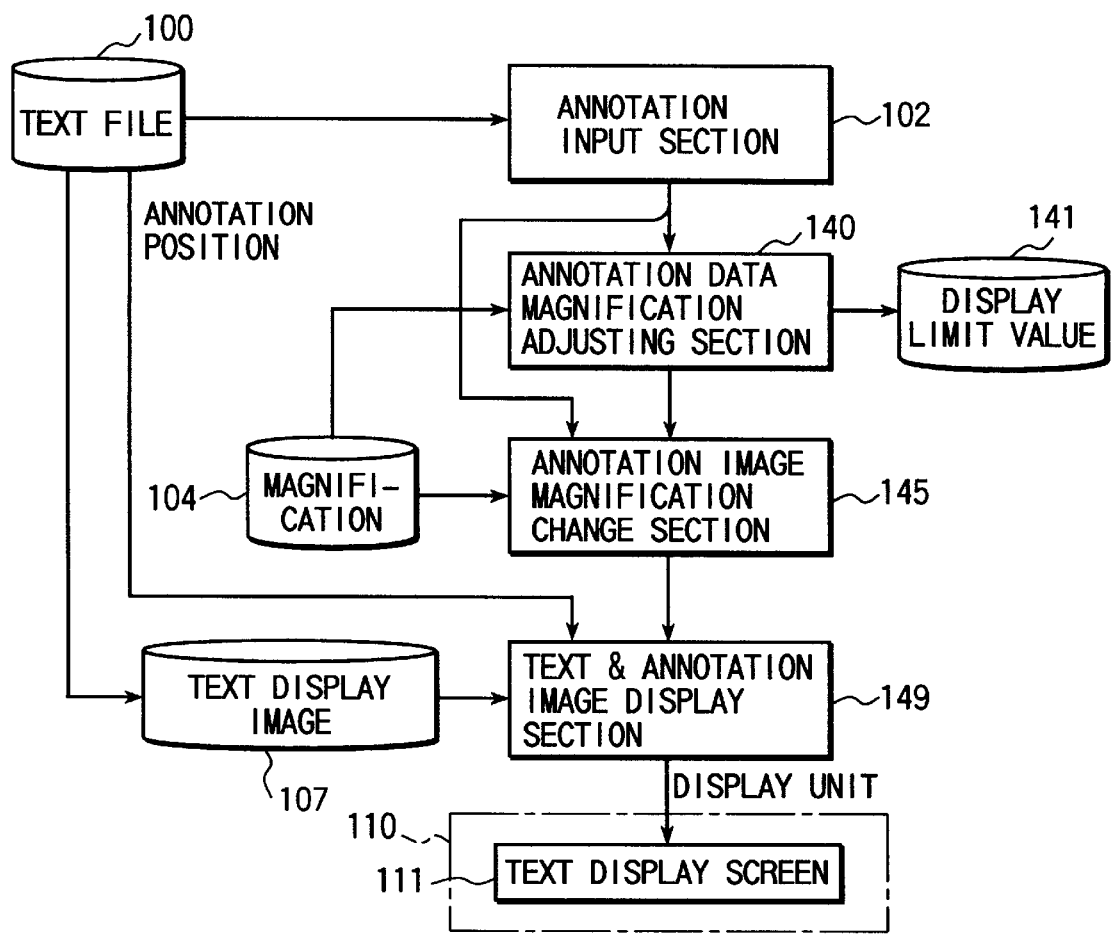
FIG. 19 is a block diagram of a schematic configuration of a data processing apparatus with an annotation display function according to a fourth embodiment of the present invention.

FIG. 19 is a block diagram of a schematic configuration of a data processing apparatus with an annotation display function according to a fourth embodiment of the present invention. In FIG. 19, the same parts as those in FIG. 1 are indicated by the same reference symbols.

The data processing apparatus of FIG. 19 differs from that of FIG. 1 in that there is additionally provided an annotation data magnification adjusting section 140 that, when the display magnification of an annotation data item given from the annotation input section 102 has been changed to a magnification of R, adjusts the magnification to a magnification of Ri that enables the annotation data item to be enlarged to a size not smaller than a display limit value, if the size of the display image after the change of magnification is smaller than the display limit value and a display limit value storage section 141 for storing the display limit value for each type of annotation data item, and in that an annotation image magnification change section 145 and a text and annotation image display section 149 that differ partially in processing function from the annotation image magnification change section 105 and text and annotation image display section 109 are provided instead of the latter.

The display limit value stored in the display limit value storage section 141 is determined as follows. For example, it is assumed that when Chinese character text is displayed on a display unit 110 displaying the text display screen 111, a Chinese character made up of horizontal and vertical lines is crushed if the character is displayed in eight dots or less. In this case, when an annotation data item includes Chinese character text, the display limit value is eight dots.

Similarly, in the case of line-drawing data, when the portion where two lines are drawn separately before reduction is reduced to the extent that the two lines are in contact with each other, it is difficult to distinguish one line from the other on the reduced screen. The size that more than a certain amount of the area in the bounding box of line drawing is painted over with drawing lines can be determined to the display limit value.

In the configuration of FIG. 19, the annotation input section 102 reads the annotation set so as to correspond to a text stored in the text file 100, creates information on the positions and size of the individual input annotation data items constituting the annotation on the annotation input window, and creates display annotation data made up of the information and the original annotation data.

The annotation data magnification adjusting section 140, when the display image of the annotation data item has been reduced or enlarged with a magnification of R (in this case, R<1 for reduction), checks to see if the size of the display image after the change of magnification is smaller than the display limit value, on the basis of the positions and size of the display annotation data items created by the annotation input section 102, the magnification R indicated by the magnification storage section 104, and the display limit value in the display limit value storage section 141 corresponding to the annotation data item.

If the size of the display image after the change of magnification is smaller than the display limit value, the annotation data magnification adjusting section 140 will adjust the magnification of the corresponding annotation data item to the smallest magnification Ri that enables the annotation data item to be enlarged to a size not smaller than the display limit value.

If the size of the display image after the change of magnification is larger than the display limit value, the annotation data magnification adjusting section 140 will determine the magnification R indicated by the magnification storage section 104 to be the magnification Ri for the corresponding annotation data item.

From this time on, the operation of the annotation image magnification change section 145 and that of the text and annotation image display section 149 are the same as the operation of the annotation image magnification change section 105 and that of the text and annotation image display section 109 in FIG. 1 except that the magnification is Ri set for each annotation data item, not R common to each annotation data item. Specifically, the annotation image magnification change section 145 converts the coordinates (xi, yi) of each annotation data item on the annotation input window before the change of magnification into the coordinates (xi*Ri, yi*Ri) on the annotation input window with the changed magnification R on the basis of the size (wi, hi) of the display image of the annotation data item and the magnification Ri. The annotation image magnification change section also changes the size of the display image of the annotation data item with a magnification of (wi*Ri, hi*Ri).

Receiving this, the text and annotation image display section 149 displays the display image of the corresponding annotation data item with a size of (wi*Ri, hi*Ri) at the coordinates (xi*Ri, yi*Ri).

As described above, when the reduced image of an annotation is displayed on text, an annotation data item difficult is to see if it is reduced to a size smaller than the display limit value is reduced and displayed with the smallest magnification Ri (Ri>R) that enables the annotation data item to be enlarged to a size not smaller than the display limit value, instead of reducing all of the annotation data items equally with a specified magnification of R. This prevents a reduced image whose size is smaller than the display limit value from being displayed and makes the characters and drawings legible even on a reduced screen, as compared with the case where all of the annotation data items are reduced equally.

Figure 20:
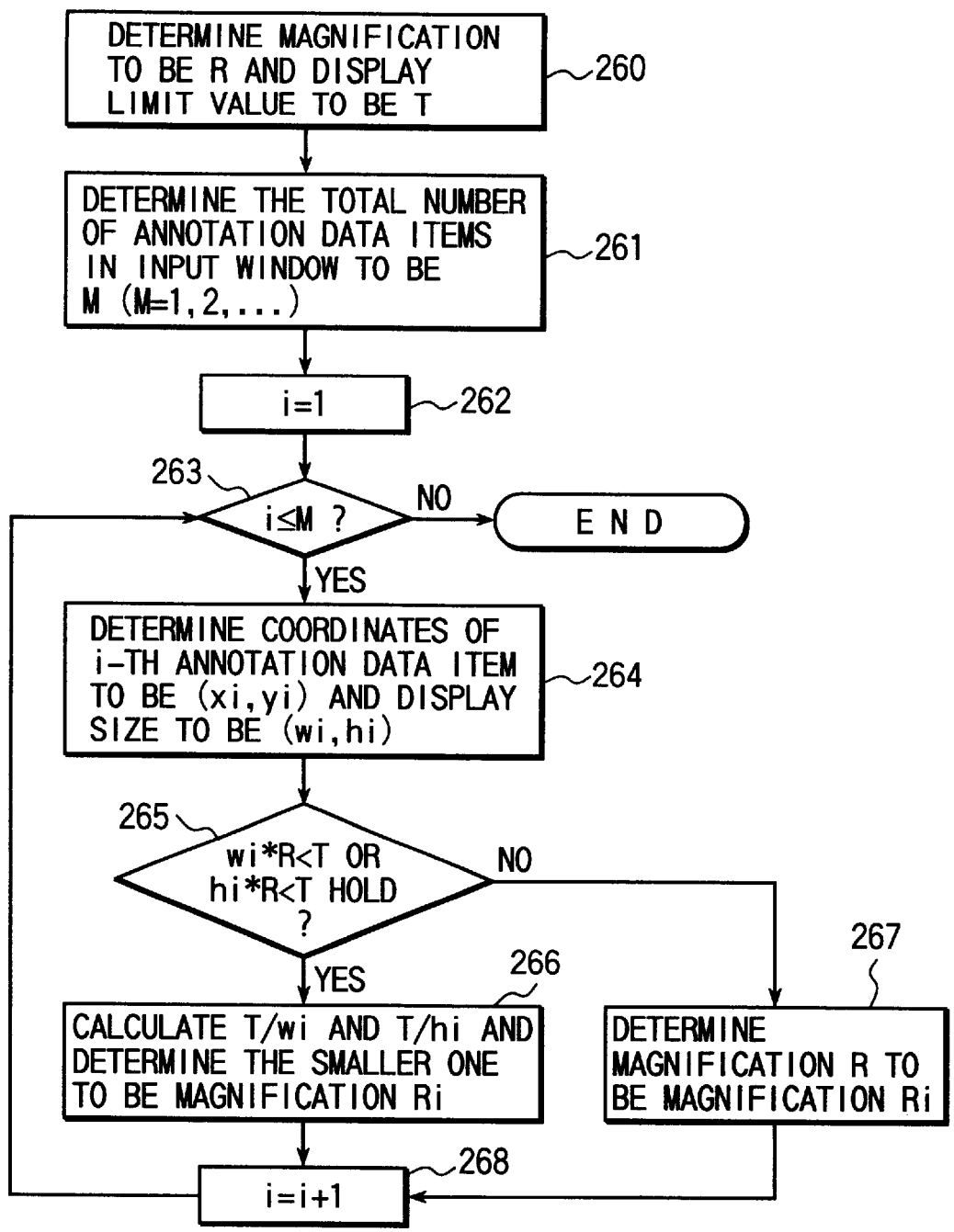
FIG. 20 is a flowchart to help explain the operation of the annotation data magnification adjusting section 140 in the configuration of FIG. 19.
Figure 22:
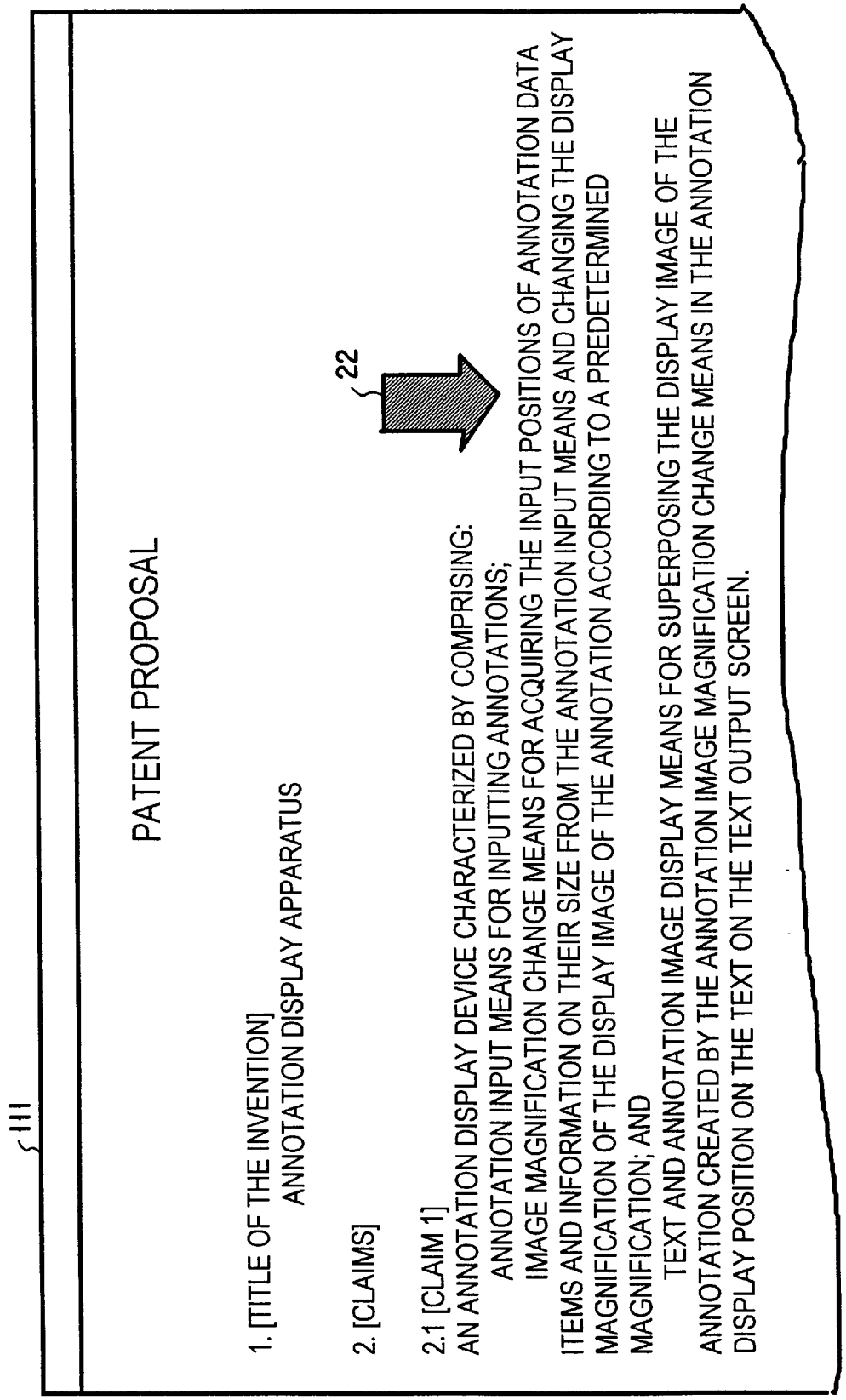
FIG. 22 shows a conventional text display screen with an annotation mark indicating that an annotation has been pasted on text.

The operation of the annotation data magnification adjusting section 140 will be described in detail by reference to a flowchart in FIG. 20.

Suppose the text character string "NOVELTY IS PRESENT, INVESTIGATION OF RELATED PATENTS IS NEEDED" is written in a small size at the top of the annotation input window and the handwritten character string "RECONSIDERATION" is written below the former string.

In this case, when the display image of the annotation input window of FIG. 21A is simply reduced and displayed, a reduced annotation display image 21b as shown in FIG. 21B is shown on the text display screen 111. On the reduced annotation display image 21b of FIG. 21B, the text is displayed in very small characters and the character display area is crushed, making it difficult to imagine what is written.

Then, on the basis of the display limit value T and magnification R corresponding to the type of the annotation data item, the position (xi, yi) of the annotation data item obtained from the annotation input section 102 and the size (wi, hi), the annotation data magnification adjusting section 140 checks to see if the size of the annotation data item on the annotation input window is smaller than the display limit value T when the annotation data item has been reduced with the magnification R (steps 264, 265).

When the size of the annotation data item is smaller than the display limit value T, the smallest magnification that enables the annotation data item to be not smaller than the display limit value T is found. The smallest magnification is determined to be the magnification Ri applied to the relevant annotation data item (step 266). When the size of the annotation data item is not smaller than the display limit value T, the magnification R (the magnification indicated by the magnification storage section 104) is determined to be the magnification Ri applied to the relevant annotation data item (step 267).

Whether or not the reduced image of an annotation data item is smaller than the display limit value T can be judged as follows. If the bounding box of an annotation data item is (xi, yi, wi, hi) and at least one of the following equations holds:

$wi*R<T$ $hi*R<T$ it can be judged that the reduced image of the annotation data item is smaller than the display limit value T.

The smallest magnification Ri that prevents the size of the annotation data item from being smaller than the display limit value T is calculated as the smaller of T/wi and T/hi.

The annotation data magnification adjusting section 140 repeats the above processes for all of the annotation data items on the input window (steps 261 to 263 and step 268).

In this way, the annotation data magnification adjusting section 140 changes the display form of the annotation data item and finally a reduced annotation display image 21c as shown in FIG. 21C is displayed. On the reduced annotation display image 21C of FIG. 21C, because the text is displayed in larger characters than those on the reduced annotation display image 21b of FIG. 21B with the specified magnification R, even if the annotation data item is reduced, what has been written is legible. Since the magnification Ri is set for each annotation data item, it is impossible to accurately display the positional relationship and size of annotation data items in the reduced annotation display image. For example, in FIG. 21C, only the partial character string "NOVELTY IS PRESENT, INVESTIGATION OF" (of the full string "NOVELTY IS PRESENT, INVESTIGATION OF RELATED PATENTS IS NEEDED") is displayed on the reduced annotation display image 21c.

In the configuration of FIG. 1, the processing functions of the annotation input section 102, the annotation image magnification change section 105, and the text and annotation image display section 109 are realized by using a recording medium (e.g., a memory card, a floppy disk, or a CD-ROM) on which a program that causes a data processing apparatus, such as a computer, having a CPU to realize the processing functions, loading the recording medium into the data processing apparatus, and forcing the data processing apparatus to read and execute the program recorded on the recording medium. The program may be down-loaded from a network through a communication channel. The same is true for the processing functions of the annotation input section 102, the annotation data display overlap removing section 120, the annotation image magnification change section 125, and the text and annotation image display section 129 in FIG. 8, the processing functions of the annotation input section 102, the annotation blank area separating section 130, the annotation image magnification change section 135, and the text and annotation image display section 139 in FIG. 14, and the processing functions of the annotation input section 102, the annotation data magnification adjusting section 140, the annotation image magnification change section 145, and the text and annotation image display section 149 in FIG. 19.

As described in detail so far, with the present invention, because the display image of the annotation input window at the time of annotation input is reduced or enlarged with a specified magnification and the display image is superposed in a specified position on the text display image on the text display screen, the user can check the contents of the annotation, while reading the text.

Furthermore, with the present invention, because a reduced display image of the annotation from which the overlapping of annotation data items has been removed is displayed, the contents of the annotation can be checked easily, even if they are difficult to check as a result of simply reducing the annotation.

Moreover, with the present invention, because only the area from which blanks have been removed is to be reduced and displayed, the contents of the annotation can be displayed larger with the entire display size remaining unchanged, even when simply reducing the annotation would make the contents difficult to check. This makes it possible to check the contents of the annotation easily.

Still furthermore, with the present invention, since an annotation data item is sensed whose contents would be difficult to check if the annotation data item were simply reduced and displayed with a specified magnification because the display size of the annotation data is small, and the smallest magnification that prevents the display size of the annotation data item after the change of magnification from being smaller than the display limit value is applied, the contents of the annotation can be displayed larger with the entire display size remaining unchanged, making it possible to check the contents of the annotation easily.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing apparatus with an annotation display function, comprising:
   an annotation data input section configured to acquire annotation data which have been pasted at a specified annotation position in a document, the annotation data including annotation position data and annotation size data;
   an annotation image magnification change section configured to change a magnification of an image of said annotation on the basis of the annotation position data, the annotation size data, and a specified magnification; and
   a document and annotation display section configured to display an image of the document and the image of said annotation whose magnification has been changed by said annotation image magnification change section at said specified annotation position.

2. A data processing apparatus with an annotation display function, comprising:
   an annotation data input section configured to acquire annotation data which have been pasted at a specified annotation position in a document, the annotation data including annotation position data and annotation size data;
   an annotation overlap removing section configured to sense an overlapping area where images of at least two annotations overlap with each other, on the basis of the annotation position data and the annotation size data, to determine an image of an annotation to be displayed in the overlapping area, and to generate specific information indicating the overlapping area and the image of the annotation to be displayed in the overlapping area;
   an annotation image magnification change section configured to change a magnification of an image of said annotation where a portion of the image of the annotation except for a portion of the annotation to be displayed in said overlapping area has been subtracted from said overlapping area indicated by said specific information on the basis of the annotation position data, the annotation size data, and a specified magnification; and
   a document and annotation display section configured to display an image of the document and the image of said annotation whose magnification has been changed by said annotation image magnification change section at said specified annotation position.

3. A data processing apparatus with an annotation display function, comprising:
   annotation input means for taking in individual data items constituting an annotation pasted in a specified annotation position on a text as a result of the annotation being input from an annotation input window and acquiring input positions of the annotation data items and information on a size of the annotation data items;
   annotation blank area separating means for sensing a smallest rectangular area including an area in which said individual annotation data items have been input from said annotation input window on the basis of the input positions of the individual annotation data items in said annotation and the information on the size acquired by said annotation input means;
   annotation image magnification change means for changing a display magnification of a display image of said annotation to be displayed in said rectangular area on the basis of information on said rectangular area sensed by said blank area separating means, the input positions of the individual annotation data items in said annotation and information on the size of the individual annotation data items acquired by said annotation input means, and a specified magnification; and
   text annotation image display means for putting and displaying the display image of said annotation having the magnification changed by said annotation image magnification change means in said specified annotation position on a text display image.

4. A data processing apparatus with an annotation display function, comprising:
   annotation input means for taking in individual data items constituting an annotation pasted in a specified annotation position on a text as a result of the annotation being input from an annotation input window and acquiring input positions of the annotation data items and information on a size of the annotation data items;
   annotation data magnification adjusting means which, on the basis of the information on the size of the annotation data items acquired by said annotation input means, a specified magnification, and a display limit value indicating a limit value of a display size with which a user can identify a display image of the annotation data items, checks to determine if the display size with said specified magnification is smaller than said display limit value for each of the annotation data items in said annotation and which, if the display size is smaller than said display limit value, determines a smallest magnification necessary for making the display size of the display image of said annotation data item larger than said display limit value to be a magnification for the annotation data item and, if the display size is not smaller than said display limit value, determines said specified magnification to be the magnification for the annotation data item;

annotation image magnification change means for changing the display magnification of the display image of said annotation on the basis of the input positions of the individual annotation data items in said annotation and the information on the size of the individual annotation data items acquired by said annotation input means and a magnification for each of said individual annotation data items determined by said annotation data magnification adjusting means; and text and annotation image display means for putting and displaying the display image of said annotation having the magnification changed by said annotation image magnification change means in said specified annotation position on a text display image.

5. An annotation displaying method comprising:

acquiring annotation data which have been pasted at a specified annotation position in a document, the annotation data including annotation position data and annotation size data;

changing a magnification of an image of an annotation on the basis of the annotation position data, the annotation size data, and a specified magnification; and displaying an image of the document and the image of said annotation whose magnification has been changed at said specified annotation position.

6. An annotation displaying method comprising:

acquiring annotation data which have been pasted at a specified annotation position in a document, the annotation data including annotation position data and annotation size data;

sensing an overlapping area where images of at least two annotations overlap with each other, on the basis of the annotation position data and the annotations, determining an image of an annotation to be displayed in the overlapping area, and generating specific information indicating the overlapping area and the image of the annotation to be displayed in the overlapping area;

changing a magnification of an image of said annotation where a portion of the image of the annotation except for a portion of the annotation to be displayed in said overlapping area has been subtracted from said overlapping area indicated by said specific information on the basis of the annotation position data, the annotation size data, and a specified magnification; and displaying an image of the document and the image of said annotation whose magnification has been changed at said specified annotation position.

7. A annotation displaying method comprising:

a first act of taking in individual data items constituting an annotation pasted in a specified annotation position on a text as a result of the annotation being input from an annotation input window and acquiring input positions of the annotation data items and information on the size of the annotation data items;

a second act of sensing a smallest rectangular area including an area in which said individual annotation data items have been input from said annotation input window on the basis of the input positions of the individual annotation data items in said annotation and the information on the size of the individual annotation data items acquired in said first act;

a third act of changing a display magnification of a display image of said annotation items to be displayed in said rectangular area on the basis of the input positions of the individual annotation data items in said annotation and the information on the size of the individual annotation data items acquired in said first act, a specified magnification, and information on said rectangular area sensed in said second act; and a fourth act of putting and displaying the display image of said annotation having a magnification changed in said third act in said specified annotation position on a text display image.

8. A annotation display method comprising:

a first act of taking in individual data items constituting an annotation pasted in a specified annotation position on a text as a result of the annotation being input from an annotation input window and acquiring input positions of the annotation data items and information on the size of the individual annotation data items;

a second act of, on the basis of the information on the size of the annotation data items acquired in said first act, a specified magnification, and a display limit value indicating a limit value of a display size that enables a user to identify a display image of the annotation data items, checking to determine if the display size with said specified magnification is smaller than said display limit value for each of the annotation data items in said annotation and, if the display size is smaller than said display limit value, determining a smallest magnification necessary for making the display size of the display image of said annotation data item larger than said display limit value to be the magnification for the annotation data item and, if the display size is not smaller than said display limit value, determining said specified magnification to be the magnification for the annotation data items;

a third act of changing a display magnification of a display image of said annotation on the basis of the input positions of the individual annotation data items in said annotation and the information on the size of the individual annotation data items acquired in said first act and the magnification for each of said individual annotation data items determined in said second act; and a fourth act of putting and displaying the display image of said annotation having a magnification changed by said third act in said specified annotation position on a text display image.

9. A computer-readable memory comprising:

a first program code for causing a computer to acquire annotation data which have been pasted at a specified annotation position in a document, the annotation data including annotation position data and annotation size data;

a second program code for causing the computer to change a magnification of an image of an annotation on the basis of the annotation position data, the annotation size data, and a specified magnification; and a third program code for causing the computer to display an image of the document and the image of said annotation whose magnification has been changed at said specified annotation position.

10. A computer-readable medium comprising:

a first set of machine-readable information for causing a computer to acquire annotation data which have been pasted at a specified annotation position in a document, the annotation data including annotation position data and annotation size data;

a second set of machine-readable information for causing the computer to sense an overlapping area where images of at least two annotations overlap with each other, on the basis of the annotation position data and the annotation size data, to determine an image of an annotation to be displayed in the overlapping area, and to generate specific information indicating the overlapping area and the image of the annotation to be displayed in the overlapping area;

a third set of machine-readable information for causing the computer to change a magnification of an image of said annotation where a portion of the image of the annotation except for a portion of the annotation to be displayed in said overlapping area has been subtracted from said overlapping area indicated by said specific information on the basis of the annotation position data, the annotation size data, and a specified magnification; and a fourth set of machine-readable information for causing the computer to display an image of a document and the image of said annotation whose magnification has been changed at said specified annotation position.

11. A computer-readable medium comprising:

a first set of machine-readable information for causing a computer to take in individual annotation data items constituting an annotation pasted in a specified annotation position on a text as a result of the annotation being input from an annotation input window and to acquire input positions of the annotation data items and information on a size of the annotation data items;

a second set of machine-readable information for causing the computer to sense a smallest rectangular area including an area in which said individual annotation data items have been input from said annotation input window on the basis of the input positions of the individual annotation data items in said annotation and information on the size of the annotation data items;

a third set of machine-readable information for causing the computer to change a display magnification of a display image of said annotation to be displayed in said rectangular area on the basis of information on said sensed rectangular area, the input positions of the individual annotation data items in said annotation and information on the size of the annotation data items, and a specified magnification; and a third set of machine-readable information for causing the computer to put and display the display image of said annotation whose magnification has been changed in said specified annotation position on a text display image.

12. A computer-readable medium comprising:

a first set of machine-readable information for causing a computer to take in individual data items constituting an annotation pasted in a specified annotation position on a text as a result of the annotation being input from an annotation input window and to acquire the input positions of the annotation data items and information on a size of the annotation data items;

a second set of machine-readable information for causing the computer to check, based on the information on the size of the annotation data items, a specified magnification, and a display limit value indicating a limit value of a display size with which a user can identify a display image of the annotation data items, to see if the display size with said specified magnification is smaller than said display limit value for each of the annotation data items in said annotation and which, if the display size is smaller than said display limit value, to determine a smallest magnification necessary for making the display size of the display image of said annotation data item larger than said display limit value to be the magnification for the annotation data item and, if the display size is not smaller than said display limit value, to determine said specified magnification to be a magnification for the annotation data item;

a third set of machine-readable information for causing the computer to change the display magnification of a display image of said annotation on the basis of the input positions of the individual annotation data items in said annotation and the information on the size of the individual annotation data items and the magnification for each of said individual annotation data items; and a fourth set of machine-readable information for causing the computer to put and display the display image of said annotation, having the changed magnification, in said specified annotation position on a text display image.

13. A data processing apparatus with an annotation display function, comprising:

an annotation data input section configured to acquire annotation data which have been pasted at a specified annotation position in a document, the annotation data including annotation position data and annotation size data;

a blank area separation section configured to sense a smallest rectangular area among areas including images of annotations on the basis of the annotation position data and the annotation size data;

an annotation image magnification change section configured to change a magnification of an image of an annotation on the basis of information on said rectangular area, the annotation position data, the annotation size data, and a specified magnification; and a document and annotation display section configured to display an image of the document and the image of the annotation whose magnification has been changed by said annotation image magnification change section at said specified annotation position.

14. A data processing apparatus with an annotation display function, comprising:

an annotation data input section configured to acquire annotation data which have been pasted at a specified annotation position in a document, the annotation data including annotation position data and annotation size data;

an annotation magnification adjustment device configured, on the basis of the annotation size data, a specified magnification, and a display limit value indicating a limit value of a display size with which a user can identify a display image of an annotation, to determine whether the display size with said specified magnification is smaller than said display limit value, to set a smallest magnification necessary for making the display size of the display image of said annotation larger than said display limit value as a magnification for the annotation if the display size is smaller than said display limit value, and to set said specified magnification as the magnification for the annotation if the display size is not smaller than said display limit value;

an annotation image magnification change section configured to change a magnification of an image of said annotation on the basis of the annotation position data, the annotation size data, and the magnification determined by said annotation data magnification adjustment section; and a document and annotation image display section configured to display an image of the document and the image of said annotation whose magnification has been changed by said annotation image magnification change section at said specified annotation position.

15. An annotation displaying method comprising:

acquiring annotation data which have been pasted at a specified annotation position in a document, the annotation data including annotation position data and annotation size data;

sensing a smallest rectangular area among areas including images of annotations on the basis of the annotation position data and the annotation size data;

changing a magnification of an image of an annotation on the basis of information on said rectangular area, the annotation position data, the annotation size data, and a specified magnification; and displaying an image of the document and the image of the annotation whose magnification has been changed by said annotation image magnification change section at said specified annotation position.

16. An annotation displaying method comprising:

acquiring annotation data which have been pasted at a specified annotation position in a document, the annotation data including annotation position data and annotation size data;

determining, on the basis of the annotation size data, a specified magnification, and a display limit value indicating a limit value of a display size with which a user can identify a display image of an annotation, whether the display size with said specified magnification is smaller than said display limit value, setting a smallest magnification necessary for making the display size of the display image of said annotation larger than said display limit value as a magnification for the annotation if the display size is smaller than said display limit value, and setting said specified magnification as the magnification for the annotation if the display size is not smaller than said display limit value;

changing a magnification of an image of said annotation on the basis of the annotation position data, the annotation size data, and the magnification determined by said determining act; and displaying an image of the document and the image of said annotation whose magnification has been changed at said specified annotation position.

\* \* \* \* \*